US007897169B2

(12) United States Patent
Ueda et al.

(10) Patent No.: US 7,897,169 B2
(45) Date of Patent: Mar. 1, 2011

(54) UBIQUINOL-ENRICHED FAT-CONTAINING FOODS

(75) Inventors: Yasuyoshi Ueda, Hyogo (JP); Shiro Kitamura, Hyogo (JP); Tadayoshi Shiraishi, Hyogo (JP); Masayuki Abe, Hyogo (JP); Takeshi Kawashima, Hyogo (JP); Toshinori Ikehara, Hyogo (JP)

(73) Assignee: Kaneka Corporation, Kita-ku, Osaka-shi (JP)

( * ) Notice: Subject to any disclaimer, the term of this patent is extended or adjusted under 35 U.S.C. 154(b) by 1242 days.

(21) Appl. No.: 10/501,669

(22) PCT Filed: Jan. 20, 2003

(86) PCT No.: PCT/JP03/00395
§ 371 (c)(1),
(2), (4) Date: Jan. 7, 2005

(87) PCT Pub. No.: WO03/061395
PCT Pub. Date: Jul. 31, 2003

(65) Prior Publication Data
US 2005/0112266 A1 May 26, 2005

(30) Foreign Application Priority Data
Jan. 18, 2002 (JP) .................................. 2002-009738

(51) Int. Cl.
*A61K 47/00* (2006.01)
(52) U.S. Cl. ........................................................ 424/439
(58) Field of Classification Search .................... None
See application file for complete search history.

(56) References Cited

U.S. PATENT DOCUMENTS

| 5,258,179 | A | | 11/1993 | Bracco et al. | |
| 6,045,826 | A | * | 4/2000 | Borowy-Borowski et al. | 424/451 |
| 6,156,351 | A | * | 12/2000 | Shapira | 426/2 |
| 6,441,050 | B1 | | 8/2002 | Chopra | |
| 2005/0069996 | A1 | * | 3/2005 | Yajima et al. | 435/156 |

FOREIGN PATENT DOCUMENTS

| EP | 0 659 402 A2 | 6/1995 |
| EP | 0 803 201 A2 | 10/1997 |
| EP | 0 956 854 A1 | 11/1999 |
| EP | 1 386 905 A1 | 2/2004 |
| EP | 1 415 972 A1 | 5/2004 |
| JP | 57-070815 A | 5/1982 |
| JP | 57-142911 A | 9/1982 |
| JP | 7-196534 A | 8/1995 |
| JP | 10-45614 A | 2/1998 |
| JP | 10-109933 A | 4/1998 |
| JP | 10-330251 A | 12/1998 |
| WO | WO 96/38047 A1 | 12/1996 |
| WO | WO 98/43617 | 10/1998 |
| WO | WO 02/17879 A1 | 3/2002 |

OTHER PUBLICATIONS

Wikipedia search "lard" (http://en.wikipedia.org/wiki/Lard) pp. 1-20.*
Span 60 (http:www.chemblink.com/products/1338-41-6.htm).*
Lambelet, Pierre et al., "Antioxidant Properties of Coenzyme $Q_{10}$ in Food Systems," *Journal of Agricultural & Food Chemistry*, vol. 40, No. 4, Apr. 1, 1992, pp. 581-584.
Cabrini, Luciana et al., "Antioxidants and Total Peroxyl Radical-Trapping Ability of Olive and Seed Oils," *Journal of Agricultural and Food Chemistry*, vol. 49, 2001, pp. 6026-6032.
International Search Report from Corresponding International Application No. PCT/JP03/00395, Dated Apr. 30, 2003, 2 pages.
Weber, C. et al., "Antioxidative Effect of Dietary Coenzyme $Q_{10}$ in Human Blood Plasma," *Vitamin and Nutrition Research*, 1994, vol. 64, No. 4, pp. 311-315.
V. Barzanti, et al, "The Effect of Dietary Lipid Changes on the Fatty Acid Composition and Function of Liver, Heart and Brain Mitochondria in the Rat at Different Ages", British Journal of Nutrition, vol. 71 (2): pp. 193-202 (1994).
Extended European Search Report on EP 09 15 4846.1, dated Apr. 24, 2009, 8 pages.
XP 022517673 for Kubo, Hiroshi et al. "Food Content of Ubiquinol-10 and Ubiquinone-10 in the Japanese Diet," *Journal of Food Composition and Analysis*, Academic Press, London, GB, vol. 21, No. 3, 12 pages.
XP 002523298 for Mattila, Pirjo et al. "Coenzymes $Q_9$ and $Q_{10}$: Contents in Foods and Dietary Intake," *Journal of Food Composition and Analysis*, vol. 14, No. 4, 9 pages.
XP 002082210 for Duell, P. Barton "Prevention of Atherosclerosis with Dietary Antioxidants: Fact or Fiction?" *Journal of Nutrition*, Wistar Institute of Anatomy and Biology, Philadelphia, PA, U.S., vol. 126, No. 4S, 5 pages.

* cited by examiner

*Primary Examiner* — Robert A Wax
*Assistant Examiner* — Bethany Barham
(74) *Attorney, Agent, or Firm* — Connolly Bove Lodge & Hutz LLP

(57) ABSTRACT

To provide a food which suitably supply ubiquinol, a substance indispensable to the living body but is liable to be decreased and fall short of the requirements, through ingestion in the same ways as the ordinary foods in daily living. A ubiquinol-enriched oil/fat-containing food.

9 Claims, No Drawings

UBIQUINOL-ENRICHED FAT-CONTAINING FOODS

RELATED APPLICATIONS

This application is a nationalization of PCT Application No. PCT/JP03/00395 filed Jan. 20, 2003. This application claims priority from Japanese Patent Application No. 2002-9738 filed on Jan. 18, 2002.

TECHNICAL FIELD

The present invention relates to a ubiquinol-enriched oil/fat-containing food which can supply ubiquinol, a substance indispensable to the living body, through ingestion in the same ways as the ordinary foods in daily living, uses thereof, and processes for producing said food.

BACKGROUND ART

Ubiquinol is the $2e^-$-reduced form of ubiquinone which is a benzoquinone derivative distributed broadly in the living world. Ubiquinol and ubiquinone, both of which are localized in mitochondria, lysosomes, Golgi bodies, microsomes, peroxisomes, cell membranes, etc., are substances indispensable for the maintenance of biological functions as constituents of the electron transport system, and are known to be involved in activation of ATP production, antioxidant activity in the living body, and membrane stabilization. Paying attention to its vitamin-like function, ubiquinone is also called as vitamin Q, which is a factor capable of rejuvenating the body as a nutrient for reinstating depressed cell activity to healthy state.

In the living body, ubiquinol and ubiquinone are in a certain equilibrium state, and it is known that the ubiquinol/ubiquinone absorbed into the body are mutually oxidized/reduced. It is reported that usually, in the living body, ubiquinol accounts for 60 to 90% of the total weight of ubiquinol and ubiquinone.

Since ubiquinone is not only supplied from diets but also biosynthesized in the body, it might be considered that the necessary amount of ubiquinol and ubiquinone is available in the normal state but it is known that actually the ubiquinol/ubiquinone content in the body is markedly decreased due to aging and various stresses to which the living body is subjected.

For example, it is reported that whereas the ubiquinone content in the human heart in the 19 to 21 years of age is 110.0 μg/g, the content is drastically reduced to less than one-half, namely 47.2 μg/g, in the 77 to 81 years of age [Kalen, A. et al., Lipids, 24, 579-584 (1989)]. Moreover, the ubiquinone content in plasma is decreased in uremic patients, patients under chronic hemodialysis treatment, and patients with various allergic diseases as compared with healthy persons (Triolo, L., Nephron, 66, 153-156 (1994); Folkers, K., BioFactors, 1, 303-306 (1988)]. In patients with hyperlipemia, the ubiquinone content in the LDL cholesterol fraction is decreased [Kontush, A., et al., Atherosclerosis, 129, 119-126 (1997)]. Furthermore, it has been pointed out that administration of cholesterol synthesis inhibitors which are in common use today as therapeutic drugs for hypercholesterolemia inhibits the biosynthesis of ubiquinone as well, causing decrease in ubiquinone concentration in tissues [E. L. Appelkvist et al., Clinical Investigator, 71, S97-S102 (1993)]. In addition, decreases in the tissue concentration are suspected under conditions where peroxides are easily produced in the living body, such as strenuous exercises or overfatigue.

Decreases in the ubiquinol and ubiquinone content in the body characteristically lead to decreases in ATP productivity and cardiac function, decreased resistance to oxidation stress, and instability of the biomembranes, thus being deleterious to health. To make up for a shortage of ubiquinol and ubiquinone is benefit for promoting energy production in mitochondria, enhancing the antioxidant capacity of the living body, and maintenance of homeostasis.

Ubiquinone is expected to exhibit efficacy in the amelioration and/or prevention of diseases of the heart, hypertension, obesity, diabetes, cancer, Parkinson's disease, periodontal diseases, neuropathy, allergies, reproductive potential, exercise tolerance, immune functions, fatigue, and the like.

For example, elevation of the cardiac function due to administration of ubiquinone has been reported [Kishi, T. et al., Clin. Investg., 71, S71-S75 (1993)]; ameliorating efficacy in cardiac diseases such as congestive heart failure, angina pectoris, myocardial infarction, etc. by ubiquinone [Singh, R. B. et al., Inter. J. Cardiology, 68, 23-29 (1999), Singh, R. B. et al., Cardiovasc. Drugs Ther., 12, 347-353 (1998)]; preventive and ameliorative efficacy in atherosclerosis, hypertension, diabetes, cancer, periodontal diseases, and allergies [Singh, RB. et al., Atherosclerosis, 148, 275-282 2000, Digiesi, V., et al., Curr. Therap. Res., 51, 668-672 (1992), Kishi, T., et al., Journal of Dental Health, 43, 667-672 (1993), Shimura Y., et al., Rinsho-to-Kenkyu, 58, 1349-1352 (1981)]; reproductive potential-improving effect, inhibition of oxidation of LDL cholesterol, dialysis frequency-reducing effect in renal dialysis patients, nonspecific immunity-potentiating effect, and the like are known [Stocker et al., Mol. Aspects Med., 18, S85-S103 (1997), Lippa, S., Mol. Aspects Med., 15, S213-S219 (1994)]. Furthermore, ubiquinone is already in use clinically as a therapeutic drug for the palpitation, short breadth, and anasarca arising from congestive heart failure or mild heart diseases.

In order to make up for the deficiencies in ubiquinol and ubiquinone in the living body which occur in the daily activity of living, it is necessary to supply the ubiquinone appropriately. In cases of the oxidation stress disturbance pointed out to occur in excessive exercises, not only in persons of the middle age to elderly persons but also in young individuals, the ubiquinol content is decreased and it is, therefore, important to enhance the antioxidant capacity of the body by ubiquinol feeding. To enhance the ubiquinol content in the living body, it has for some time been attempted to supply an exogenous ubiquinone.

As means for feeding the ubiquinone which tend to become decreased and fall short of the requirements in daily lives despite their being indispensable for the maintenance of biological functions as mentioned above, it has already been practiced to supply this substance as a drug or as a food supplement in the form of tablets or capsules but for healthy or semi-healthy persons in whom deficiencies are slight and unqualified for medical care, and the like persons, it is more convenient to take this substance in the same ways as the ordinary food than taking it in the form of tablets or capsules.

The ubiquinol/ubiquinone content in food is usually measured as the ubiquinone content which is easy to determine. According to the available data, whereas ubiquinone is known to occur broadly in many ordinary foodstuffs of the animal or vegetable origin, such as meats, fish meats, cereals, vegetables, fruits, and eggs, the content is generally low except in beef in which it is as high as 30 μg/g, and the like. For example, the said content is as low as about 1.5 μg/g in hen's eggs, about 1.1 μg/g in wheat breads, and about 0.52 μg/g in potatoes, so that the daily ingestion from the usual diets is about 3 to 5 mg. Furthermore, the absorption rate of ubiquinone after oral ingestion is low, so that with the ordinary foods taken in the usual manner, it is not easy to achieve ubiquinol/ubiquinone supply.

Since ubiquinone and ubiquinol are considered to be in equilibrium state in the living body, if the ubiquinone-enriched food is utilized in such a situation, it seems possible to supply ubiquinol and ubiquinone in which one is liable to be deficient but only a few kinds of ubiquinol- or ubiquinone-enriched foods have been available to this day. As regards a ubiquinone-containing food, we know only of Japanese Kokai Publication Hei-10-45614 entitled "Blood coagulation-inhibitory food for diet therapy and drug", and the like, but there is not a case in which food is ever supplemented with ubiquinol. Japanese Kokai Publication Hei-10-45614, referred to above, discloses a blood coagulation-inhibitory food for diet therapy which comprises corn germ oil which is rich in ubiquinone but, in this art, the ubiquinone inherently contained in corn germ oil is utilized and contemplation about enrichment of food with ubiquinone is not described.

Meanwhile, ubiquinol has not attracted much attention because it is in some kind of equilibrium with ubiquinone in the living body but recent years have witnessed several reports arguing that ubiquinol is more effective than ubiquinone in several applications. For example, it has been reported that ubiquinol is more efficient than ubiquinone in oral absorption (Japanese Kokai Publication Hei-10-109933) and that ubiquinols are effective in the amelioration and prevention of hypercholesterolemia, hyperlipemia, and atherosclerosis (Japanese Kokai Publication Hei-10-330251). However, the ingestion of a ubiquinol-enriched food has not been known yet.

While it is important to supply ubiquinol and ubiquinone which are indispensable to the living body but are liable to be decreased and fall short of the requirements, the following points are especially worth attention as the reasons why ubiquinol- or ubiquinone-enriched foods are not in popular use or hardly popularized.

(1) Ubiquinol is highly absorbable orally and more effective than ubiquinone but since ubiquinol is an unstable compound which is readily converted to ubiquinone by air oxidation, it is not easy to enrich foods with ubiquinol in a stabilized manner.

(2) Ubiquinone is low in oral absorbability.

(3) The source of the antioxidant activity is ubiquinol. Thus, because ubiquinol is oxidized to ubiquinone, a deficiency in ubiquinol occurs, rather than a deficiency in ubiquinone, in oxidation stress disturbance.

(4) When ubiquinone or ubiquinol is merely added to food, it cannot be uniformly dissolved or dispersed and even if uniformly dissolved or dispersed once, it will separate out during storage or be localized within the food to adversely affect the flavor, texture and appearance of the food, thus failing to provide a fully satisfiable food product.

Under such circumstances, if the above-mentioned drawbacks (1) and (4) are overcome, it will be possible to develop and provide meritorious foods with which ubiquinol may be supplied with ease and good efficiency.

SUMMARY OF THE INVENTION

The present invention has for its object to provide a meritorious food which can supply ubiquinol, a substance indispensable to the living body but are liable to be decreased and fall short of the requirements, with ease and good efficiency through ingestion in the same ways as the ordinary foods in daily living, more preferably a meritorious food which does not give to the consumer uncomfortable feelings in the aspects of flavor, texture, and appearance of the food, uses thereof, and processes for producing said food.

The present inventors have for some time been interested in the functions of ubiquinol and exploring in earnest for foods which can supply ubiquinol with ease. As a result, they discovered that, in the presence of an oil/fat, ubiquinol is appropriately protected against oxidation and, at the same time, can be uniformly dispersed in foods with a reduced risk for localization during storage. Further investigations led the inventors to the finding that a ubiquinol-enriched oil/fat-containing food insures ubiquinol addition for enrichment as an outstandingly favorable food with the assurance of high stability and good absorbability of ubiquinol, more preferably a food which does not give to consumers uncomfortable feelings in terms of appearance, flavor, and texture. Thereby, the present invention is completed. That no uncomfortable feeling is given to consumers in terms of appearance, flavor and texture means, as subsumed in its concept, the freedom from impairment of the inherent appearance, flavor and texture of food, thus offering the great advantage that the consumer may ingest the food repeatedly.

The present invention is directed to a food provided with the following features and properties of ubiquinol, that is to say ubiquinol-enriched oil/fat-containing foods.

(1) Ubiquinol is tasteless and odorless, not impairing the inherent flavor of food.

(2) Ubiquinol is better absorbed orally than is ubiquinone.

(3) Ubiquinol is not only as effective as ubiquinone but rather superior to ubiquinone in many respects, for example in terms of antioxidant activity and in the ameliorative/preventive efficacy in hypercholesterolemia, hyperlipemia and atherosclerosis, and the like.

(4) Ubiquinol can be uniformly dispersed in foods in the presence of an oil/fat with a reduced risk for localization during storage.

(5) Although ubiquinol is readily oxidized to ubiquinone in air, it is well protected from oxidation in the presence of an oil/fat. More preferably, the following feature/properties may also be applied if desired.

(6) Ubiquinol forms a white solid phase or a colorless liquid phase. Therefore, this substance hardly impairs the appearance (color) of foods and does not add, or hardly adds, an extraneous color to foods which are by themselves colorless or white to pale yellow, preferably colorless or white to milky white, more preferably colorless or white.

Thus, the present invention relates, in a first aspect, to a ubiquinol-enriched oil/fat-containing food, preferably the above-mentioned oil/fat-containing food having the following characteristic modes:

(1) It further contains ubiquinone.

(2) Its ubiquinol/ubiquinone ratio is not less than ½ (by weight).

(3) It has been enriched with ubiquinol and ubiquinone in a proportion of 0.0001 to 50% by weight as ubiquinone based on the total weight of the oil/fat-containing food.

(4) Its oil/fat content is not less than 0.5% by weight.

(5) The weight ratio of ubiquinol to oil/fat is not more than 1.

(6) The oil/fat-containing food is at least one species selected from the group consisting of edible oils/fats, milk and dairy products, sauces, breads, pies, cakes, confections, roux, seasoning liquors, ice confections, noodles, processed foods, boiled rice preparations, jams, canned foods, and beverages.

(7) It further contains an antioxidant and/or an edible color.

(8) The antioxidant and/or edible color is at least one species selected from the group consisting of ascorbyl palmitate, ascorbyl stearate, catechin, lecithin, tocopherol, tocotrienol, lignan, and carotenoid.

(9) It is a colorless or white to pale yellow food.

(10) The colorless or white to pale yellow food is at least one species selected from the group consisting of edible oils/fats, milk, dairy products and beverages.

(11) The ubiquinol is an (all-E)-isomer.

(12) The process for producing the ubiquinol is a fermentation process.

The present invention relates, in a second aspect, to a process for supplying ubiquinol easily which comprises ingesting the oil/fat-containing food mentioned above.

The present invention relates, in a third aspect, to a process for producing the above-mentioned oil/fat-containing food which comprises adding ubiquinol together with an emulsifier and/or an oil/fat-containing food ingredient to a food material, one preferred embodiment of which is a process for producing the above-mentioned oil/fat-containing food which comprises adding ubiquinol having a purity in excess of 0.01%.

DETAILED DESCRIPTION OF THE INVENTION

The present invention relates to a ubiquinol-enriched oil/fat-containing food.

The "enrichment" referred to above and elsewhere in this specification does not subsume the mode of inherent presence of ubiquinol or ubiquinone in trace amounts in any oil/fat-containing food but means artificial addition of ubiquinol in an effective amount to an oil/fat-containing food for imparting the efficacy and/or effect of ubiquinol to the oil/fat-containing food.

The oil/fat-containing food mentioned above may be, for example, a food prepared by adding ubiquinol to an oil/fat or to an oil/fat-containing food, a food prepared by adding an oil/fat and ubiquinol to an oil/fat-free food, or the like.

In the present invention, the ubiquinol to be added for enrichment may be substantially exclusively composed of ubiquinol or, optionally, a mixture of ubiquinone and ubiquinol.

Ubiquinone, like ubiquinol, is tasteless and odorless so that it does not impair the inherent flavor of foods and can be uniformly dispersed in the food in the presence of an oil/fat with a reduced risk of localization during storage. In cases where a ubiquinone/ubiquinol mixture is used, the ubiquinol-to-ubiquinone ratio is not particularly restricted but the recommended ratio, by weight, of ubiquinol is preferably not less than 1/2, more preferably not less than 1/1, still more preferably not less than 2/1, most preferably not less than 3/1. In the sense that the above-mentioned bioavailability and efficacy of ubiquinol can be sufficiently expressed, the above ratio is recommended. Unlike ubiquinol, ubiquinone forms a yellow to orange solid phase or a yellow to orange liquid phase and, therefore, depending on the amount added for enrichment, tends to impart a yellowish color to the food. Within the above ratio, it is allowable to suitably add said mixture to oil/fat-containing foods whose inherent colors are colorless or white to pale yellow, preferably colorless or white to milk white, more preferably colorless or white, thus providing the functional effect that the addition thereof does not give or hardly gives to the consumer uncomfortable feelings.

The oil/fat-containing food of the present invention is a food obtainable by enriching the substrate oil/fat-containing food with ubiquinol and/or ubiquinone at a level somewhere between the lower limit of preferably 0.0001% by weight, more preferably 0.001% by weight, still more preferably 0.01% by weight, most preferably 0.1% by weight, and the upper limit of preferably 50% by weight, more preferably 10% by weight, still more preferably 5% by weight, most preferably 2% by weight, as ubiquinone based on the total weight of the oil/fat-containing food. If the level of enrichment is below 0.0001% by weight based on the total weight, the effect of supplying may not be sufficient. Addition beyond 50% by weight may cause difficulties in attaining a substantially uniform solution or dispersion.

The oil/fat for use in the present invention preferably has a melting point of not lower than 20° C., and more preferably not lower than 25° C. If the melting point is below 20° C., solid-liquid separation may occur during storage to make it difficult to obtain a uniform distribution of ubiquinol. However, oils/fats having a melting point of below 20° C. may also be used with advantage and, in this case, the ubiquinol-containing oil/fat composition is preferably provided in the form of an oil-in-water emulsion.

In this specification, any oil/fat having a melting point of not lower than 20° C. (i.e. any oil/fat which are solid at 20° C.) will hereinafter be referred to sometimes as "a solid fat", while any oil/fat having a melting point of below 20° C. (i.e. an oil/fat which is liquid at 20° C.) will be referred to sometimes as "a liquid oil".

In the present invention, where the oil/fat occurring in the food of the present invention is a mixture of two or more different species, such a mixture having a melting point of not less than 20° C. will also be referred to as a solid fat and such a mixture having a melting point of below 20° C. as a liquid oil.

The melting point of an oil/fat means a slip melting point. The slip melting point can be measured by the method described in the Standard Methods for Analysis of Oils and Fats (The Japan Oil Chemists' Society, 1996 edition).

In the present invention, the ubiquinol/ubiquinone content can be determined by the method which comprises optionally subjecting a raw material containing these substances to a suitable pretreatment such as milling and drying, subjecting said material or pretreated material further to 2 to 3 stirring/dissolving sessions, each for a duration of about 1 hour, in a suitable solvent (for example, about 10 parts by volume, relative to each part by dry weight of the material), such as chloroform/methanol (2/1, v/v) for extraction, removing the solvent from the extract by distillation to recover an extracted oil, dissolving this extracted oil in hexane, ethanol or the like, and, referring to the method for assay of ubidecarenone (another name of ubiquinone) as described in A Commentary on the Pharmacopoeia of Japan, XIII (Hirokawa Shoten, 1996), subjecting the resulting solution to analysis by high performance liquid chromatography (HPLC analysis).

The oil/fat-containing food to be enriched with ubiquinol according to the present invention is not particularly restricted in ingredients, composition, production process, form, use, and the like and may be selected optionally provided that the food inherently contains an oil/fat or to which an oil/fat may be added. The concentration of oil/fat in said oil/fat-containing food is preferably not less than 0.5% by weight, more preferably not less than 1% by weight, still more preferably not less than 2% by weight, most preferably not less than 3% by weight, for these oil/fat levels are advantageous in that the food can be enriched with ubiquinol uniformly and in high concentrations and also in that the efficacy of ubiquinol may be more efficiently expressed.

In the oil/fat-containing food of the present invention, the ubiquinol to oil/fat ratio by weight is not particularly restricted but is preferably not more than 1, more preferably not more than 1/2, still more preferably not more than 1/3, and most preferably not more than 1/4. Within this range, the food can be enriched with ubiquinol and ubiquinone in stabilized condition.

The ubiquinol/ubiquinone ratio can be found by HPLC analysis and is represented by the following equation.

Ubiquinol/ubiquinone ratio=weight of ubiquinol/ weight of ubiquinone

The oil/fat which can be used in the oil/fat-containing food of the present invention is not particularly restricted provided that it is an edible oil/fat, and there may be mentioned, for example, vegetable oils such as rapeseed oil, soybean oil, sunflower seed oils cottonseed oil, peanut oil, rice bran oil, corn oil, safflower oil, olive oil, kapok oil, sesame oil, evening primrose oil, palm oil, shea butter, sal fat, cacao butter, coconut oil, palm kernel oil, wheat germ oil, and perilla oil; animal oils/fats such as milk fat, beef tallow, lard, fish oil, and whale oil; and processed edible oils/fats derived from the above oils by fractionation, hydrogenation, transesterification or the like; and the like. For example, medium-chain fatty acid triglycerides (MCT), e.g. triglycerides of fatty acids containing 6 to 12 carbon atoms, preferably 8 to 12 carbon atoms, partial glycerides of fatty acids (monoglycerides and diglycerides), e.g. monoglycerides, diglycerides, etc. of fatty acids containing 6 to 18 carbon atoms, preferably 6 to 12 carbon atoms, and the like are also included among species of said oil/fat. These oils/fats may be unpurified oils/fats or purified oils/fats without any restriction. In consideration of application to cooking or frying, oils having smoke points of not lower than 170° C. may also be used.

As examples of the oil/fat-containing food which can be enriched with ubiquinol according to the present invention, there may be mentioned edible oils/fats, milk and dairy products, sauces, breads, pies, cakes, confections, roux, seasoning liquors, ice confections, noodles, processed foods, boiled rice preparations, jams, canned foods, beverages, and the like.

The term "edible oils/fats" in the context of the present invention means any of oils and fats of the vegetable origin, animal origin, microbial origin, fish origin or the like, that is predominantly composed of triglycerides, diglycerides, phospholipids, etc.; edible purified processed oils derived from the above oils by hydrogenation, fractionation, transesterification, or a suitable combination of such treatments, margarine products such as margarine, processed margarine, and fat spread; butters, shortenings, and the like. As the form of use of these oils/fats, there may be mentioned the forms for ingesting as they are, the forms for using in the processing of other foods, and the forms for eating together with other food ingredients, and the like. For example, such forms as cooking oils for frying, cooking oils for roasting, cooking oils for salads, and spray oils, etc. can be mentioned. Among such edible oils/fats, margarines, butters, and shortenings, which are comparatively high in processing degrees are preferred because of the ease of use as foods.

The "milk and/or dairy products" in the context of the present invention include not only the "milk", "dairy products", and "foods composed predominantly of milk or dairy products" as defined in the Japanese Ministry of Health regulations, namely milk, e.g. cow's milk, special cow's milk, sterilized goat's milk, partially defatted milk powder, processed milk, etc., various dairy products, e.g. creams, whipped creams, butters, butter oils, cheeses such as cheese and cheese-food, concentrated whey, ice creams, concentrated milk, whiteners, non-sweetened condensed milk, sweetened condensed milk, whole milk powders, cream powders, whey powders, protein concentrated whey powders, butter milk powders, sweetened milk powders, modified milk powders, fermented milks, lactic acid bacteria beverages, milk beverages, etc. and various fermented dairy products, e.g. sour milks such as yogurt, alcohol fermentation milks such as kefir and koumiss, etc., but also synthetic creams, cheese-like foods, and the like.

As the "sauces" in the context of the present invention, there may be mentioned warm-prepared sauces such as white source, cream sauce, etc. and cold-prepared sauces such as mayonnaise, salad dressing, etc.

As the "breads" in the context of the present invention, there may be mentioned white bread, bread rolls, sweet baked buns, dainty-filled bread, steamed buns, doughnuts, and the like.

As the "pies" in the context of the present invention, there may be mentioned, apple pie, marron pie, pumpkin pie, meat pie, and the like.

The "cakes" in the context of the present invention include sponge cakes such as short cake and cake roll; butter cakes such as pound cake and fruit cake; chou cakes such as chou a la creme (cream puff) and eclair; fermented cakes such as savarin; cream jelly cakes such as unbaked cheesecake; dessert foods such as puddings and blancmange and the like.

As the "confections" in the context of the present invention, there may be mentioned Japanese style confections, snacks, chocolate and chocolate confections, fried confections, gums, candies. More particularly, said Japanese style confections include various fresh confections, e.g. rice cakes such as mochi and ohagi; steamed confections such as mushi-manju, mushi-yohkan, and uirō; baked confections such as dorayaki, kintsuba, manju, geppei, and castella; cast confections such as yōkan, paste confections such as nerikiri, and gyūhi; semi-fresh confections, e.g. bean-jam confections such as ishigoromo, okamono such as monaka, baked confections such as chatsū; dry confections such as uchimono (hard-molded confections), e.g. rakugan, etc., and sweetened fermented beans; and the like: said snacks include cookies, biscuits, crackers, potato chips, corn chips, pretzel, nuts, popped corn, cereals, rice confections such as arare, okaki and senbei; and the like: said fried confections include karintō and the like; said gums include sheet gums, balloon gums, sugar-coated gums, sugarless gums, and the like: said candies include hard candies such as drops and brittles, soft candies such as caramels and nougats; sugar-coated candies (kakemono) such as kompeito and jelly beans; refreshing sweets such as ramune-gashi; and the like.

As the "roux" in the context of the present invention, there may be mentioned roux blanc (white roux), roux blond (cream-colored roux), roux brun (brown roux), and the like.

The "seasoning liquors" in the context of the present invention means those liquids in general which are used for improving the flavor, shelf-life, processability, etc. of food in cooking/processing stages, and specifically, there may be mentioned bastes such as sesame baste, baste for roast eels, and baste for roast beef, pickling liquors, and the like.

As the "ice confections" in the context of the present invention, there may be mentioned ice-cream, sherbet (sorbet), ice candies, and the like.

The "noodles" in the context of the present invention mean any and all foods produced by noodling or otherwise dividing a dough or batter prepared by kneading a cereal flour with water or the like, specifically including udon, sōmen, hiya-mugi, chukamen (Chinese noodles), etc. all of which are prepared using wheat flour as the main raw material, various types of pasta such as spaghetti and macaroni which are based on durum semolina, soba based on buckwheat flour, Chinese rice noodles based on rice flour, harusame based on starch, and the like.

As the "processed food" in the context of the present invention, there may be mentioned processed meat products such as hams, sausages, and bacon hams, fish paste foods such as kamaboko and chikuwa, fried foods such as croquettes, pork cutlets, fried potatoes, and fried prawn, and frozen foods such as frozen entree, frozen animal products, and frozen farm products, and the like.

As the "boiled rice preparation" in the context of the present invention, there may be mentioned not only boiled rice but also takikomi gohan (boiled rice with other ingredients), fried rice, vinegar-seasoned rice, and the like.

As the "jams" in the context of the present invention, there may be mentioned foods prepared from fruits, such as mandarin orange, strawberry, apple, grape, Chinese gooseberry, and fig, vegetables such as pumpkin, flower petals of ballade, etc. by boiling them to suitable concentrations together with sugar.

As the "canned foods" in the context of the present invention, there may be mentioned canned or bottled foods prepared by filling meat, fish meat, fruits, vegetables, etc. inclusive of the corresponding processed foods, into containers, followed by clinching or capping.

As the "beverages" in the context of the present invention, there may be mentioned soy-milk, coconut milk, coffee drinks such as coffee with milk and café au leit; black tea drinks such as tea with milk and spiced tea (chai); carbonated beverages such as floats and cola drinks; flavored water such as lemon juice-containing mineral water; sports drinks; vegetable juice and fruit juice drinks based on various vegetables and fruits; and the like.

The present invention encompasses not only the oil/fat-containing foods exemplified above but also the corresponding oil/fat-containing foods subjected to multi-stage processing inclusive of coating, topping, folding or sandwiching, bean-jam enclosing, kneading-in, and the like.

Among the above-mentioned oil/fat-containing foods, those of comparatively high processing degrees, that is to say the foods as close to the ingestion forms as possible are preferred. Taking the edible oils/fats as an example, margarines, butters and shortenings, all of which are higher in the processing degree than oils/fats and edible purified processed oils/fats derived from these oils/fats by hydrogenation, fractionation, transesterification, or a suitable combination of such treatments, are more readily ingestible and, therefore, preferred. In addition, milk or dairy products, sauces, breads, pies, cakes, confections, roux, seasoning liquors, ice confections, noodles, processed foods, boiled rice preparations, jams, canned foods, and beverages are also preferred.

Furthermore, as the oil/fat-containing food according to the present invention, foods rich in oil/fat are preferred as mentioned hereinbefore.

Moreover, among the above-mentioned foods, generally colorless or white to pale yellow foods, preferably colorless or white to milk white foods, still more preferably colorless or white foods are particularly recommended. From this point of view, the effect of the present invention is maximized in edible oils/fats, milk, dairy products, and beverages. In addition, from the standpoint of the ease of taking in daily living, beverages are recommendable.

The oil/fat-containing food of the present invention may be enriched with an antioxidant and/or an edible color in addition to ubiquinol. Enrichment with an antioxidant and/or an edible color enhances the heat stability and light stability of ubiquinol in the oil/fat-containing food and, at the same time, contributes to maintenance of the flavor of the food. As the antioxidant and/or edible color suited for the enrichment according to the present invention, there may be mentioned ascorbyl palmitate, ascorbyl stearate, catechin, lecithin, tocopherol, tocotrienol, lignan; and carotenoids such as astaxanthin, and lycopene; and the like, and either one or two or more of these can be used. Of course, commercial antioxidants and edible colors can be utilized. In the present invention, the level of enrichment with said antioxidant and/or edible color is not particularly restricted but, generally, it is preferably 0.001 to 10% by weight, still more preferably 0.005 to 1% by weight, based on the total weight of the oil/fat-containing food. If the level of addition is below 0.001% by weight, the effect of addition of the antioxidant and/or edible color may not be fully expressed. If added beyond 10% by weight, these additives tend to adversely affect the flavor and appearance of the oil/fat-containing food.

The ubiquinol for use in the present invention may be one produced by any conventional technology regardless of whether it is a synthetic process or a fermentation process but when due regard is given to the safety to the living body, an (all-E)-isomer which is the same as the one occurring naturally in foods such as animal meat and fish meat is preferred and, moreover, the one derived from a fermentation process is preferred (Biomedical and Clinical Aspect of Coenzyme Q, 3, 19 (1981)]. The term "derived from a fermentation process" as used herein means that the said preferred stereoisomers are those obtained by fermentation technology, not excluding the cases in which, for example, ubiquinone and/or ubiquinol of the (all-E)-isomer as obtained by a fermentation process is converted to a desired proportion of ubiquinol, with the steric configuration being retained, by a treatment such as oxidation or reduction. The stereochemistry can be analyzed by HPLC in the conventional manner.

Moreover, the ubiquinol for use in the present invention can be produced by reducing the ubiquinone obtained by a conventional process with an ordinary reducing agent such as sodium borohydride, sodium dithionate (sodium hydrosulfite), zinc, or the like in the conventional manner. Following this reduction reaction, crystallization or chromatographic concentration may be carried out. Ubiquinol can be used regardless of whether it is solid, liquid, crystalline, or amorphous.

By ingesting the oil/fat-containing food of the present invention in the same way as the ordinary oil/fat-containing food, one can easily supply oneself with ubiquinol, which is indispensable to the living body, but are liable to be decreased and fall short of the requirements. The ingestion amount of the oil/fat-containing food of the present invention is not particularly restricted but is preferably determined taking such factors as sex, body weight, and age of the recipient person into consideration and further with reference to the ingestion data generated through use as a drug or a food supplement. The daily ingestion of the oil/fat-containing food in terms of ubiquinone, is about 0.1 to 500 mg, preferably about 1 to 200 mg. If the ingestion amount is less than 0.1 mg, the expected effect may not be sufficient, while an ingestion of more than 500 mg may prove uneconomical, although the effect will be sufficient.

The process of the present invention can be applied not only to man but also to other mammals such as dogs, cats, horses, cattle, pigs, goats, sheep, mice and rats and even to birds such as cocks and hens.

In the present invention, provided that the ingestion of ubiquinol is made by the ingestion of oil/fat-containing foods, the mode, quantity, and frequency of ingestion are not particularly restricted. The process for supplying according to the present invention is more advantageous than the conventional method using a drug, a food supplement or the like because it does not give to the consumer uncomfortable feelings, permits expedient and long-term ingestion with ease, can be liberally controlled in the ingestion amount according to the prevailing circumstances, can be adapted to the gustatory and other sensory predilection which vary with different individuals, and the like. Furthermore, ubiquinol has the tendency of being more bioavailable when ingested together with an fatty ingredient than the case when it is taken alone and, from this point of view, too, it is a very meritorious method to ingest ubiquinol-enriched oil/fat-containing foods.

The present invention is further related to a process for producing a ubiquinol-enriched oil/fat-containing food.

Production of the ubiquinol-enriched oil/fat-containing food of the present invention is not particularly restricted but can be effected by adding a necessary amount of ubiquinol in the course of food production.

In the addition of ubiquinol to an oil/fat-containing food, the ubiquinol can be used regardless of whether it is in a solid form or a liquid form inclusive of a dispersion, but from the standpoint of the ease of handling, the liquid form is preferred. One recommended procedure comprises adding and stirring ubiquinol, taking care not to cause formation of lumps, together with, preferably, a food ingredient containing an edible emulsifier and/or an oil/fat, more preferably, a food ingredient containing an oil/fat, in a solvent or a dispersion medium, optionally under appropriate warming. The resultant well-stirred mixture can be added to an oil/fat-containing food with advantage. In the case where the oil/fat-containing food of the present invention is produced by using the ubiquinol-containing composition thus prepared, said composition can be added and mixed in the food in any desired stage of production of the food. When the oil/fat-containing food of the present invention is a beverage, it is preferable to add ubiquinol in the form of an emulsion, for example a W/O emulsion or an o/W emulsion. By this procedure, an oil/fat-containing food uniformly enriched with a high concentration of ubiquinol can be easily produced.

In said food ingredient containing an emulsifier and/or an oil/fat to which ubiquinol has been added as above for use in the production of the oil/fat-containing food of the present invention, it is not indispensable that the ubiquinol has been completely dissolved therein but it is preferable that the ubiquinol has been either completely dissolved or microemulsified in order that the end-product oil/fat-containing food may be fully satisfactory in flavor, texture, appearance, and bioavailability or in order to avoid the precipitation and localization of ubiquinol and/or ubiquinone which might occur usually during storage.

In the case where the oil/fat-containing food of the present invention is produced by using ubiquinol in a solid form, the ubiquinol may be added in any stage but in order that a uniform distribution of ubiquinol in an oil/fat-containing food may be achieved and improvements in flavor, texture and appearance may be realized, the ubiquinol may be added and admixed in the stage where said ingredient containing an emulsifier and/or an oil/fat is added or in a subsequent stage.

The oil/fat-containing food ingredient mentioned above is preferably rich in oil/fat, thus specifically including edible oils/fats, milk, dairy products, and the like.

The emulsifier mentioned above is not particularly restricted but the following synthetic or natural substances can be mentioned. There can be mentioned, for example, glycerol fatty acid esters, polyglycerol fatty acid esters, organic acid monoglycerides, propylene glycol fatty acid esters, polyglycerol esters of interesterified ricinoleic acid, sorbitan fatty acid esters, sucrose fatty acid esters, and lecithin inclusive of enzymatically degraded lecithin and hydrogenated lecithin.

In cases where the oil/fat-containing food of the invention is to be enriched not only with ubiquinol but also with said antioxidant and/or edible color, the method for enrichment is not particularly restricted and may for example comprise mixing the above additive or additives into the substrate food together with said ubiquinol-containing composition under stirring for homogenization. An alternative procedure comprises adding the antioxidant and/or edible color to a solvent or a dispersion medium, preferably a food ingredient containing an emulsifier and/or an oil/fat, more preferably a food ingredient containing an oil/fat, still more preferably an emulsifier and/or an oil/fat, most preferably an oil/fat, under stirring for homogenization and using the mixture as it is or adding it to an oil/fat-containing food for enrichment.

In the preferred embodiment of practice of the present invention, the localization of ubiquinol can be completely prevented by dissolving the ubiquinol in oils/fats under heating, cooling the solution to give a homogeneous oil/fat composition, and manufacture food products using the composition.

In the case where the enrichment is carried out with ubiquinol over its solubility limit in the oil/fat, the preferred procedure using a solid fat comprises dissolving ubiquinol under heating and cooling the solution for solidification or kneading it for plasticization, or preparing an oil-in-water emulsion. The heating temperature is preferably not lower than the melting points of the solid fat and ubiquinol, and more preferably 50 to 70° C. The cooling procedure is preferably quenching to 20° C. or below for improved homogeneity. Moreover, the above solidified or plasticized oil/fat composition may be an anhydrous one or a water-in-oil emulsion. In either case, the ubiquinol can be uniformly incorporated in the solid fat which is a continuous phase. It is also permissible to add an emulsifier or the like which is conventionally used.

On the other hand, in cases where the enrichment is carried out with ubiquinol beyond its solubility limit in the oil/fat, the preferred procedure using a liquid oil comprises dissolving the ubiquinol in the oil/fat under heating and cooling the solution to prepare an oil-in-water emulsion. The heating temperature is preferably not lower than the melting point of ubiquinol, more preferably 50 to 70° C., and the cooling procedure is preferably quenching to 10° C. or below. By adopting an oil-in-water emulsion form, the ubiquinol can be uniformly incorporated in oil droplets dispersed uniformly in the water forming a continuous phase. To this oil-in-water emulsion, the emulsifier, thickener, etc., which are commonly used in oil-in-water emulsions, may optionally be added. In the case of an oil composition comprising a liquid oil alone instead of an oil-in-water emulsion, ubiquinol may remain uniformly dispersed immediately after cooling but chances are that as time goes by a solid-liquid separation takes place so that it is very likely that a bias occurs in the distribution of ubiquinol.

Since a kneadability characteristic is required in the production of foods based on wheat flour, e.g. breads, baked confections, etc., in particular, a plastic oil/fat composition obtainable from a solid fat is advantageous. Moreover, an oil-in-water emulsion composition may be added to an aqueous phase and, in this case, a liquid oil can be used.

The oil/fat-containing food of the present invention may further contain, in addition to ubiquinol and said antioxidant and/or edible color, those additives which are conventionally added to ordinary foods within the range not adversely affecting the solubility, stability, bioavailability, etc. of the ubiquinol. For example, there can be added vitamins such as vitamin A and vitamin D; inorganic salts such as common salt; sucrose; artificial or synthetic sweeteners such as aspartame; food proteins such as milk protein; thickeners such as CMC; antioxidants such as butylhydroxytoluene (BHT); preservatives such as sorbic acid, its potassium salt, benzoic acid, its sodium or potassium salt; fruits; chocolate; and the like.

The ubiquinol for use in the production of the food according to the present invention is not particularly restricted in purity, and may for example have a purity in excess of 0.01%, preferably in excess of 1%, and more preferably in excess of 10%. Aside from purified preparations, crude preparations may also be used. If safety can be assured, the ubiquinol for enrichment use need not be a purified preparation.

The crude preparations may for example be preparations as partially purified by crystallization, solvent extraction or column chromatography, and the like. As a crude preparation, the ubiquinol occurring in microbial cells can also be used. As the microorganisms containing ubiquinol, there may be mentioned yeast, fungi, bacteria, algal protozoa, and the like. More particularly, there can be mentioned microorganisms belonging to the genus *Candida*, the genus *Rhodotorula*, the genus *Trichosporon*, the genus *Aspergillus*, the genus *Monascus*, the genus *Leucosporidium*, the genus *Geotrichum*, the genus *Pseudomonas*, the genus *Acromobacter*, the genus *Gliconobacter*, the genus *Paecilomyces*, the genus *Acremonium*, the genus *Ustilago*, the genus *Chaetomium*, the genus *Flabobacterium*, the genus *Rhodospilum*, the genus *Rhodopseudomonas*, the genus *Agrobacterium*, the genus *Acetobacter*, the genus *Alcaligenes*, the genus *Protomonus*, the genus *Hyphomonus*, the genus *Oligomous*, the genus *Protaminobacter*, the genus *Supirulina*, and the like.

The ubiquinol for use in the practice of the present invention is a substance occurring not only in animals and plants but also in many kinds of foodstuffs, and its safety has been confirmed. When a crude ubiquinol preparation is used or ubiquinol-containing microbial cells are used, a sterilization or other procedure may be carried out for preventing contamination with harmful agents for purposes of safety and hygiene and/or a cell disruption or the like procedure may be carried out for improving bioavailability.

The processes for producing some representative oil/fat-containing foods of the present invention are described below. Needless to say, the process for producing the oil/fat-containing food according to the present invention is not limited to these specific processes.

The cooking oil of the present invention can be produced by using any of oils/fats which are commonly used as edible oils/fats, for example various vegetable oils such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, sal fat, cacao butter, coconut oil, and palm kernel oil, and various animal oils/fats such as milk fat, beef tallow, lard, fish oil, and whale oil; various processed oils/fats derived from the above oils by fractionation, hydrogenation, transesterification or the like; medium-chain fatty acid triglycerides (MCT) such as triglycerides of fatty acids containing 6 to 12 carbon atoms, preferably 8 to 12 carbon atoms; partial glycerides (monoglycerides and diglycerides) of fatty acids, such as monoglycerides and diglycerides of fatty acids containing 6 to 18 carbon atoms, preferably 6 to 12 carbon atoms; mixtures thereof; and the like. More particularly, the cooking oil can be produced by a process which comprises melting such oil/fat as above at a temperature not below its melting point, adding and dissolving a predetermined amount of ubiquinol in the oil/fat gradually with stirring so as to avoid formation of lumps, and finally cooling the resulting solution.

The spray oil according to the present invention can be produced by using an edible oil/fat same as that for use in the production of said cooking oil in the same manner. Optionally, for imparting a flavor to the spray oil, there may be incorporated any of various oil-soluble flavoring ingredients, oil-soluble vitamins, seasoning oils, preservatives, and other food ingredients such as salt, animal meat, poultry meat, fish meat, cream, butter, chicken, onion, garlic, basil, etc. by blending or dissolving with a conventional mixer. When the spray oil according to the present invention is used, it can be used in the same manner as ordinary spray oils.

The butter of the present invention may be produced by the process which comprises churning a cream fraction obtained from cowls milk in the conventional manner under the usual conditions, adding a predetermined amount of a ubiquinol powder or a solution or uniform dispersion of ubiquinol in an edible oil/fat gradually thereto under continued churning, washing the resulting butter particles with cold water, adding about 2.5% of common salt, and further churning the mixture.

The margarines and shortenings of the present invention can be produced by the process which comprises subjecting an oil/fat, which is used in the production of standard margarines and shortenings, and ubiquinol to mixing/dissolving/stirring and, optionally, further to emulsification. An exemplary process for the production of a margarine according to the present invention comprises feeding an ordinary edible oil/fat, a solution of ubiquinol in edible oil/fat medium, water, an emulsifier, and various optional additives to an emulsification tank to effect emulsification at 60° C. and quenching the resulting emulsion to 15° C. under churning. A margarine may also be produced, for example, by feeding an ordinary edible oil/fat and a finely divided powder of purified ubiquinol or crude ubiquinol concurrently and treating the mixture in the same manner as above. On the other hand, a shortening can be produced by a process which, for example, comprises adding a ubiquinol-enriched oil/fat to an ordinary edible oil/fat, emulsifying the mixture by a homomixer at 60° C. for about 20 minutes, and quenching the emulsion to 15° C. under churning.

The synthetic cream of the present invention can be produced by a process which comprises mixing a predetermined amount of said solution or dispersion of ubiquinol in edible oil/fat medium with a high-melting point oil such as hydrogenated rapeseed oil and hydrogenated coconut oil, and an emulsifier, warming the mixture for dissolving at about 70° C. with stirring to prepare an oil phase, adding this oil phase to an aqueous phase separately prepared by emulsifying a mixture of skim milk, dissolved salt, an emulsifier, etc. under warming at about 70° C., incubating the mixture at about 65° C. for preliminary emulsification, feeding this mixture to a homogenizer for homogenization under pressure, sterilizing the same, subjecting it further to pressure homogenization, cooling the homogenate to about 5° C., and incubating it for aging at 5° C. for about 24 hours.

The concentrated milk of the present invention can be produced by a process which comprises mixing a predetermined amount of said solution or dispersion of ubiquinol in edible oil/fat medium with an aqueous phase prepared by dissolving nonfat milk solids, nonfat milk component with taste, a thickener, and an emulsifier in water, emulsifying the whole mixture with a homogenizer, and subjecting it to sterilization and homogenization.

The whiteners of the present invention can be produced by a process which comprises mixing a predetermined amount of said solution or dispersion of ubiquinol in edible oil/fat medium with an emulsifier for emulsification to prepare an oil phase and stirring it together with an aqueous phase prepared by dissolving a nonfat milk powder, dissolved salt, a thickener, an emulsifier, a sweetener, vitamins, an antioxidant, etc. for preliminary emulsification and subjecting the whole mixture to pressure homogenization.

The salad dressing of the present invention can be produced by using a predetermined amount of said solution or dispersion of ubiquinol in edible oil/fat medium as the oil/fat to be added. Taking a mayonnaise as an example, it can be produced by mixing and stirring suitable amounts of vinegar, common salt, sugar, condiments, and water in a mixer or the like to prepare an aqueous phase and adding an oil phase separately prepared by mixing said solution or dispersion of ubiquinol in edible oil/fat medium with an emulsifier such as egg yolk gradually to said aqueous phase with stirring for preliminary emulsification and feeding the resulting pre-emulsion to a colloid mill or the like for finish-emulsification. Moreover, it can also be produced by adding a solid form of ubiquinol to the edible oil/fat and other ingredients which are used in ordinary dressings and stirring the mixture for emulsification.

The pickling liquor of the present invention can be produced by using said solution or dispersion of ubiquinol in edible oil/fat medium as the oil/fat to be added. As an alternative, a solid form of ubiquinol may be added to the edible oil/fat and other ingredients which are used in the production of ordinary pickling liquors. For example, an oil phase prepared by heating said solution or dispersion of ubiquinol in edible oil/fat medium and an emulsion stabilizer at 60° C. with stirring is added gradually to an aqueous phase separately prepared by dissolving an emulsifier in water under heating to 60° C. with stirring for crude emulsification, and after the temperature of this pre-emulsion has fallen to 50° C. or below, it is further treated with a homogenizing machine such as a pressure homogenizer for fine emulsification. Then, this emulsion is quenched with a heat exchanger such as a plate cooler.

The chocolate of the present invention can be produced by a process which comprises mixing confectionery chocolate with a predetermined amount of a solid form of ubiquinol or a solution of ubiquinol in edible oil/fat medium, stirring the mixture gradually in a water bath at 40 to 50° C., and after complete dissolution, cooling it to 30 to 32° C. Optionally, it can be poured into molds and allowed to solidify.

The breads, cakes, pies, and cookies according to the present invention are not particularly restricted in the respective production methods. Thus, at the stage of adding an oil/fat in the general course of production of breads, cakes, pies or cookies, a predetermined amount of said solution or dispersion of ubiquinol in edible oil/fat medium may be added in lieu of a portion or the whole of said oil/fat; as an alternative, said margarine or shortening enriched with ubiquinol be substituted for a portion or the whole of said oil/fat. As a further alternative, the ubiquinol in solid form or in the state occurring in microbial cells may be added simultaneously with addition of an ordinary oil/fat or together with an oil/fat-containing food ingredient. The oil/fat content in the ubiquinol-enriched bread according to the present invention is preferably 0.5 to 40% based on the total weight of the bread. Below 0.5% or over 40%, the flavor and texture may not be as good as desired.

The roux of the present invention can be produced by a process wherein, at the stage of adding an oil/fat in the routine course of production of a roux, a predetermined amount of said solution or dispersion of ubiquinol in edible oil/fat medium is added in lieu of a portion or the whole of said oil/fat; said ubiquinol-enriched margarine or shortening is added in lieu of a portion or the whole of said oil/fat; or ubiquinol in solid form or in the state occurring in microbial cells is added simultaneously with addition of an ordinary oil/fat or together with an oil-rich food ingredient, and after addition of other food ingredients and additives, the whole mixture is heated. The method of heating may be whichever of a treatment with saturated steam, a heating under pressure and, a roasting, and a heating at atmospheric pressure inclusive of oil roasting, and the like. However, the oil decoction is expedient and, therefore, advantageous and this treatment can be carried out at a temperature of 110° C. to 120° C. for a brief time in cases where the roux is not to be colored; at an ultimate temperature of 140° C. to 150° C. in cases where a cream-colored roux is to be produced; or at an ultimate temperature of 190° C. for a sufficient time in cases where a brown roux is to be produced.

The noodles of the present invention can be produced by a process wherein, at the stage of adding an oil/fat in the general course of production of noodles, a predetermined amount of said solution or dispersion of ubiquinol in edible oil/fat medium is added in lieu of a portion or the whole of said oil/fat; said ubiquinol-enriched margarine or shortening is added in lieu of a portion or the whole of said oil/fat; or ubiquinol in solid form or in the state occurring in microbial cells is added simultaneously with addition of an ordinary oil/fat or together with an oil/fat-containing food ingredient. An exemplary production protocol comprises adding and dissolving an emulsifier in said solution or dispersion of ubiquinol of the present invention in edible oil/fat medium under heating to prepare an oil phase, adding this oil phase with an aqueous phase separately prepared by heating water, sugar, etc., emulsifying the resulting mixture with a mixing machine such as a homomixer, further emulsifying the emulsion under stirring and mixing, blending this emulsion with wheat flour or the like to prepare a dough, allowing it to ripen, rolling the dough, cutting it into ribbons to give raw noodles, and either drying or boiling them.

The fried foods of the present invention can be prepared by a process which comprises frying the food ingredient for croquettes, fried prawn, pork cutlets, or the like using said solution or dispersion of ubiquinol in edible oil/fat medium according to the present invention, said ubiquinol-enriched cooking oil of the present invention, or said ubiquinol-enriched shortening of the present invention, at a high temperature of, for example, 150° C. to 220° C.

The cheese-food and cheese-like food of the present invention can be produced by the conventional methods for producing cheese-food and cheese-like food except that a solution or dispersion of ubiquinol in edible oil/fat medium of the present invention is used. In this connection, said solution or dispersion of ubiquinol in edible oil/fat medium of the present invention may be added either alone or as formulated with any other oils/fats of common use in the art at the stage of adding an oil/fat in the general production sequence. For example, a ubiquinol-enriched cheese-food can be obtained by a process which comprises charging a container such as Stephan cooker with natural cheese or processed cheese, a ubiquinol-enriched edible oil/fat composition of the present invention, common salt, dissolved salt, and water according to a predetermined recipe, warming and churning the mixture under introduction of steam, and cooling the same. A processed cheese-food, for instance, can be produced by a process which comprises charging a kettle such as Stephan cooker with less than 51%, based on the total weight of food, of natural cheese or processed cheese, a solution or dispersion of ubiquinol in edible oil/fat medium according to the present invention, common salt, dissolved salt such as sodium polyphosphate, and water according to a predetermined recipe, heating the contents by direct introduction of steam under stirring for melting, churning and placing the mixture in a vessel, and cooling the same therein. An imitation cheese can be produced by a process which comprises charging a kettle with water, dissolved salt, and common salt, heating them to prepare a solution, adding a defatted protein such as rennet-precipitated casein and skim milk powder and a thickener such as rice starch, corn starch, gum Arabic, and carrageenan, stirring the mixture under heating, further adding an acidulant or the like and water, stirring the whole under heating, adding the ubiquinol-enriched edible oil/fat composition of the present invention, stirring the mixture under heating, further adding cheese flavor, a color, an antioxidant, etc., kneading the whole mixture, and finally treating it with a high-pressure homogenizer.

The beverages of the present invention can be produced by dispersing, emulsifying, or dissolving the solution or dispersion of ubiquinol in an emulsifier and/or an edible oil/fat medium of the present invention uniformly and adding the same to the beverage material. As the beverage material, there may be mentioned cow's milk, special cow's milk, sterilized goat's milk, processed milk, coffee drinks, black tea drinks, fruit juice drinks, carbonated drinks, fruit drinks, milk-containing drinks, vegetable juices, soy milk, coconut milk, cream, and the like. Referring, further, to the beverage of the present invention, when a solution or dispersion of ubiquinol in edible oil/fat medium is used, the objective beverage can also be produced by preparing a W/O emulsion and either using it as such or adding it to a relevant beverage material. In the case where an emulsifier in which ubiquinol has been dissolved or dispersed is used, said beverage can also be produced by preparing an O/W emulsion and using it as such or adding it to the beverage material. In preparing said emulsion, other ingredients such as glycerol can be judiciously added for providing a suitable emulsion. The specific technology for preparing such an emulsion may for example be as follows. For example, an emulsifier, an emulsion stabilizer and a hydrophilic antioxidant are added to water and dispersed therein by stirring and this dispersion is heated to prepare a solution. On the other hand, an emulsifier and a lipophilic antioxidant are added and dispersed in said solution or dispersion of ubiquinol in edible oil/fat medium according to the present invention and this dispersion in oil prepared by stirring is heated to prepare a solution. The method for emulsification is not particularly restricted and there may be mentioned the various methods in common use, namely the method which comprises pouring an oil phase into an aqueous phase and emulsifying the mixture mechanically by stirring or application of a pressure, and the membrane-emulsification method which comprises extruding an oil phase into an aqueous phase through microfine orifices of a membrane, or the like method. By whichever of these methods, an emulsion having sufficiently satisfactory characteristics can be obtained. While the emulsion thus obtained may be used as it is for emulsion-containing beverages, it may be sterilized where long-term storage in emulsion form is required. The temperature, duration and other factors necessary for sterilization are not particularly restricted but when the pH is neutral, UHT sterilization at 120 to 140° C. for 4 to 30 seconds is recommended. The sterilized emulsion is aseptically filled into sterile vials and stored under refrigerator conditions. The mixing level of the emulsion in the beverage material is not particularly restricted but may be 1 to 80%, preferably 2 to 50%, in the emulsion-containing beverage. If the mixing level is below 1%, a homogeneous system may not be easily maintained. If it exceeds 80%, the formulation is not acceptable in terms of flavor and cost. The emulsion-containing beverage thus obtained is optionally subjected to pH adjustment and addition of an antibacterial agent and a sweetener, filled into heat-sterilizable containers such as cans, bottles, or pouches, sealed, and subjected to retort-sterilization at 120 to 126° C. for 15 to 60 minutes.

Regarding other foods according to the present invention, too, the production processes are not particularly restricted. Thus, at the stage of adding an oil/fat in the general course of production, a predetermined amount of said solution or dispersion of ubiquinol in edible oil/fat medium may be added in lieu of a portion or the whole of said oil/fat or said ubiquinol-enriched margarine or shortening may be added in lieu of a portion or the whole of said oil/fat. As a further alternative, ubiquinol in solid form or in the state occurring in microbial cells may be added simultaneously with addition of an ordinary oil/fat. The production of such foods can also be carried out by adding a predetermined amount of said solution or dispersion of ubiquinol in an emulsifier and/or an edible oil/fat in lieu of a portion or the whole of said oil/fat; adding said ubiquinol-enriched margarine or shortening in lieu of a portion or the whole of said oil/fat; or adding ubiquinol in solid form or in the state occurring in microbial cells simultaneously with addition of an ordinary oil/fat.

The production and storage of the oil/fat-containing food according to the present invention are preferably carried out under a nitrogen atmosphere or in an oxygen-free atmosphere, e.g. in the presence of a deoxidizer, and the like.

BEST MODE FOR CARRYING OUT THE INVENTION

The following production examples, working examples, and reference examples are intended to illustrate the present invention in further detail and should by no means be construed as defining the scope of the present invention. It should be understood that all "parts" and "%" are "parts by weight" and "% by weight" unless otherwise indicated.

Ubiquinol and ubiquinone were assayed by the following HPLC analysis.

(HPLC Analysis Conditions)
    Column: Symmetry C18 (manufactured by Waters Corp.), 250 mm (length), 4.6 mm (inner diameter)
    Mobile phase: $C_2H_5OH:CH_3OH=4:3$ (v:v)
    Detection wavelength: 210 nm
    Flow rate: 1 ml/min
    Retention time of ubiquinol: 9.1 min
    Retention time of ubiquinone: 13.3 min Production Example 1

In 1,000 g of heptane, 100 g of ubiquinone (product of Kaneka Corporation) was dissolved at 25° C. Under stirring (stirring power: 0.3 kW/m$^3$), an aqueous solution prepared by adding 1,000 ml of water to 100 g of sodium dithionite (purity: 75% or higher) was gradually added as a reducing agent and the reduction reaction was carried out at 25° C. and pH 4 to 6. After the lapse of 2 hours, the aqueous layer was removed from the reaction mixture and the heptane layer was washed 6 times with 1,000 g of a degassed saturated saline. This heptane layer was cooled to 2° C. under stirring (stirring power: 0.3 kW/m$^3$) to give a white slurry. The whole of the above operation was carried out under a nitrogen atmosphere. The slurry obtained was filtered under reduced pressure and the obtained wet crystals were washed serially with cold heptane, cold ethanol, cold water, cold ethanol, and cold heptane in that order (the temperature of each cold solvent used for washing was 2° C.). The wet crystals were then dried under reduced pressure (20 to 40° C., 133 to 400 Pa) to recover 93 g of white dry crystals (yield: 92.8 mole %, purity: 99.3%). The ubiquinol/ubiquinone ratio of the product crystals was 99.6/0.4. As analyzed by HPLC in the conventional manner, the steric configurations of both the ubiquinol and ubiquinone obtained were (all-E)-isomers.

Production Example 2

*Saitoella complicata* IFO 10748 was aerobically cultured in a medium (peptone 5 g, yeast extract 3 g, malt extract 3 g, glucose 20 g/L, pH 6.0) at 25° C. for 72 hours. The resulting cells were disrupted twice using a nitrogen gas-sealed Rannie's pressure homogenizer under a disruption pressure of 80 MPa to prepare a disrupted cell suspension. This disrupted cell suspension was subjected to extraction with 30 parts by volume of isopropanol and 40 parts by volume of hexane for a total of 3 times to obtain an extract. This extract was subjected to solvent substitution with a hexane solution and adsorbed on a column packed with a silica gel. Elution and separation were carried out with n-hexane/diethyl ether (9/1) to obtain a ubiquinol-containing fraction. This fraction was cooled to 2° C. under stirring to give a slurry. The whole of the above operation was carried out under a nitrogen atmosphere. The slurry obtained was filtered under reduced pressure and the obtained wet crystals were washed with the above elution solvent (the temperature of this solvent used for washing was 2° C.) and the washed crystals were dried under reduced pressure (20 to 40° C., 133 to 4,000 Pa) to recover dry crystals. The ubiquinol/ubiquinone ratio of the crystals thus obtained was 9/1 and the purity was 89%. As analyzed by HPLC in the conventional manner, the steric configurations of both the ubiquinol and ubiquinone obtained were (all-E)-isomers.

Example 1

Production of a Ubiquinol-Enriched Cooking Oil

A 5 L-beaker was charged with 999 g of soybean oil (brand name: Soybean Golden Salad Oil, Yoshihara Oil Mill, Ltd.) and while the oil was gently stirred at room temperature, 1 g of the ubiquinol obtained in Production Example 1 was added in small portions so as to prevent formation of lumps and the mixture was further stirred gently for dissolving to give a cooking oil enriched with about 1% of ubiquinol. The oil thus obtained was transparent and had a rich flavor, being fully qualified for use as frying oil or roasting oil. Furthermore, using rapeseed oil, hydrogenated soybean oil, sunflower seed oil, cottonseed oil, peanut oil, rice bran oil, corn oil, safflower oil, olive oil, kapok oil, sesame oil, evening primrose oil, palm oil, shea butter, sal fat, cacao butter, coconut oil, palm kernel oil, wheat germ oil, perilla oil, milk fat, beef tallow, lard, fish oil, and whale oil, respectively, in lieu of soybean oil, the above procedure was otherwise repeated to give the corresponding ubiquinol-enriched cooking oils.

Example 2

Production of a Margarine

In a 5 L-beaker, 98 parts of the hydrogenated cottonseed oil composition (brand name: Snowlite, product of Kaneka Corporation) and 2 parts of the ubiquinol obtained in Production Example 1 were gently stirred for dissolution under warming at 60 to 65° C., and 83.5 parts of the resulting oil composition and 16.5 parts of water were stirred together for emulsification in an emulsification tank at 60 to 65° C. for 15 minutes and, then, quenched to 15° C. by churning to give a ubiquinol-enriched margarine which was fully acceptable in flavor and physical properties. Furthermore, after quenching to 10° C. by churning, the emulsion was passed through a resting tube and molded with a sheet molder to obtain a ubiquinol-enriched margarine for fold-up use.

Example 3

Production of a Fat Spread

As an aqueous phase composition, 2 parts of gelatin, 1.5 parts of common salt, and 44 parts of water were warmed to 60° C. As an oil phase composition, 25 parts of hydrogenated soybean oil warmed to 60° C., 15 parts of soybean oil, 0.5 parts of the ubiquinol obtained in Production Example 1, 0.3 parts of monostearate, 0.2 parts of lecithin, 0.02 parts of vitamin A, 0.002 part of β-carotene, and 0.3 parts of tocopherol were admixed and warmed to 60° C. The aqueous phase was gradually added to this oil phase under stirring to give an emulsion. Using a combinator, this emulsion was quenched to give a ubiquinol-enriched fat spread. This fat spread was not much different from the ordinary fat spread in properties and stability and, in addition, had a smooth mouthfeel and a good flavor.

Example 4

Production of a Shortening 40 parts of an oil composition consisting of 60% of hydrogenated soybean oil (m.p.: 40° C.), 20% of palm oil, and 20% of corn oil, 40 parts of rapeseed oil, 0.5 parts of the ubiquinol obtained in Production Example 1, 0.3 parts of leucithin, and 0.3 parts of monostearate were emulsified together using a homomixer at 60° C. for 15 minutes. The emulsion was quenched to 15° C. to give a ubiquinol-enriched shortening which was fully acceptable in flavor. Furthermore, using the ubiquinol (ubiquinol/ubiquinone ratio: 9/1) prepared in Production Example 2 in lieu of the ubiquinol prepared in Production Example 1, the above procedure was otherwise repeated to give a ubiquinol-enriched shortening.

Example 5

Production of White Bread

To 70 parts of wheat flour were added 2 parts of yeast and 0.1 parts of yeast food, followed by addition of 40 parts of water and blending with a mixer to prepare a sponge dough (kneading temperature: 24° C.). After 4 hours of preliminary fermentation, 30 parts of wheat flour, 5 parts of sugar, 6 parts of the ubiquinol-enriched margarine obtained in Example 2, 2 parts of common salt, 3 parts of skim milk powder, and 23 parts of water were added thereto to prepare a finished dough. After a fermentation time of 25 minutes, the dough was divided into pieces. After a bench time of 25 minutes, each dough piece was shaped and the pieces were subjected to second fermentation at 38° C. for 50 minutes and baked at 180° C. for 35 minutes to prepare white breads. The white bread thus obtained was good in flavor and color.

Example 6

Production of Table Bread Rolls 70 parts of hard flour, 2 parts of white superior soft sugar, 2.5 parts of yeast, 0.1 parts of yeast food, and 40 parts of water were admixed and kneaded at a kneading temperature of 24.5° C. for 4 minutes. Then, a fermentation at 30° C. was carried out for 3 hours to prepare a sponge dough. Then, 20 parts of hard flour, 10 parts of soft flour, 10 parts of white superior soft sugar, 1.6 parts of common salt, 3 parts of skim milk powder, 15 parts of the ubiquinol-enriched margarine obtained in Example 2, 12 parts of whole egg, and 6 parts of water were added thereto and the resulting dough was kneaded at 28° C. for 6 minutes. Then, 15 parts of the ubiquinol-enriched margarine obtained in Example 2 was added, followed by kneading for another 5 minutes. Thereafter, a fermentation at room temperature with a fermentation time of 40 minutes was carried out. The dough was divided into pieces and, after a bench time of 10 minutes, each dough piece was shaped. The pieces were subjected to second fermentation at 38° C. for 50 minutes and baked at 245° C. for 11 minutes to produce table bread rolls. The table bread rolls thus obtained was good in flavor and color.

Example 7

Production of Croissants

A mixer bowl was charged with 80 parts of hard flour, 20 parts of soft flour, 5 parts of white superior soft sugar, 1.8 parts of common salt, 5 parts of whole egg, 3 parts of skim milk powder, 5 parts of yeast, 0.1 parts of yeast food, and 58 parts of water and the contents were mixed at a low speed for 2 minutes and at a medium speed for 3 minutes. This bowl was further charged with 5 parts of a shortening and 5 parts of the ubiquinol obtained in Production Example 2, and the whole was mixed at a low speed for 2 minutes and at a medium speed for 5 minutes. The dough-kneading temperature setting was 25° C. After a fermentation time of 30 minutes, the dough was placed in an incubator at 1° C. for a lead time of 3 hours. Then, 60 parts of the ubiquinol-enriched margarine for fold-up use as obtained in Example 2 was added and the whole was folded in four twice and let stand for 3 hours in an incubator at 1° C. for retardation. After the retardation, using a sheeter, the dough was spread out to 2.5 mm gauge and shaped to a crescent shape. The shaped pieces were subjected to second fermentation at 35° C. for 50 minutes and baked in an oven at 200° C. for 12 minutes to give croissants having a good taste and texture.

Example 8

Production of Pound Cakes

First, 405 g of the ubiquinol-enriched margarine obtained in Example 2 and 405 g of white superior soft sugar were whipped to a specific gravity of 0.65 and, then, 405 g of whole egg was added in 5 installments and admixed. Then, 450 g of sieved soft flour was added on top of the above mixture, followed by further mixing. The resulting batter, 500 g, was placed in pound-cake molds and baked at 240° C. for 33 minutes to produce pound cakes. The pound cakes thus obtained were good in taste and texture.

Example 9

Production of Pies

A mixer bowl was charged with 55 parts of hard flour, 45 parts of soft flour, 1.8 parts of common salt, and 50 parts of water and the mixture was mixed at a low speed for 2 minutes and at a medium speed for 8 minutes. To this mixture were added 5 parts of a shortening and 0.2 parts of the ubiquinol obtained in Production Example 1, and the whole was mixed at a low speed for 2 minutes and at a medium speed for 5 minutes and, then, kneaded up at a dough-kneading temperature of 20° C. After a fermentation time of 30 minutes, the dough was placed in an incubator at 1° C. for a lead time of 3 hours. After addition of the oil/fat for fold-up use, the dough was folded in four once and in three once, let stand in an incubator at 1° C. for 2 hours for retardation. After this retardation, the dough was folded in four once and in three once, then let stand in an incubator at 1° C., and shaped. For shaping, the dough was spread out to 3.5 mm gauge with a sheeter to give 10 cm square pieces and the resulting pieces were made small holes. Then, after a ruck time of about 30 minutes, the dough pieces were baked in an oven at 200° C. for 20 minutes to produce pies. Furthermore, using the disrupted cell suspension obtained in Production Example 2 in lieu of the ubiquinol obtained in Production Example 1, the above procedure was otherwise repeated to produce ubiquinol-enriched pies.

Example 10

Production of Cookies 600 g of soft flour, 250 g of white superior soft sugar, 240 g of the ubiquinol-enriched margarine obtained in Example 2, 30 g of sweetened condensed milk, and 3 g of common salt were emulsified by stirring until a suitable consistency had been obtained. Then, 4 g of ammonium carbonate was dissolved in 30 g of water and gradual emulsification was carried out at a medium speed. Then, 600 g of sieved soft flour was added, the resultant was stirred, the dough was rounded off and let stand for 24 hours. Using a sheeter, the dough was spread out to 5 mm in thickness, stamped out using the chrysanthemum flower-shaped cutter with a diameter of 4 cm, arranged on a baking tray, and baked at 220° C. for 10 minutes to produce cookies. The coolies thus obtained were good in both taste and texture.

Example 11

Production of a Whipped Cream

In a mixed oil composed of 70 parts of hydrogenated rapeseed oil having a slip melting point of 34° C. and 30 parts of hydrogenated coconut oil having a slip melting point of 32° C. were dissolved 0.8 parts of synthetic diglycerol stearate, as an emulsifier, 0.6 parts of soybean lecithin, 30 parts of rapeseed oil, and the ubiquinol obtained in Production Example 1 at an oil temperature of 70° C. to prepare an oil composition. Separately, 0.1 parts of sodium hexametaphosphate was added to 54.9 parts of skim milk and the whole was warmed to 55° C. with stirring. To this skim milk was added 45 parts of the above oil composition to which emulsifier was added, and the whole mixture was stirred for dissolving. With this solution being maintained at 65° C., a preliminary emulsification was carried out. The mixture obtained was fed to a homogenizer for homogenization under the pressure of 80 kg/cm² for a first run and the pressure of 20 kg/cm² for a second run. Thereafter, it was sterilized at 95° C. for 15 seconds, and using a plate cooler, it was cooled to 5° C., followed by 24 hours' aging in an incubator at 5° C., whereby a ubiquinol-enriched synthetic whipped cream could be obtained. The thus-prepared cream was fully acceptable in flavor. The thus-prepared synthetic whipped cream was coated on top of a sponge cake prepared in advance to provide a fancy cake.

Example 12

Production of a Concentrated Milk

To 10 parts of soybean oil (brand name: Soybean Golden Salad Oil; product of Yoshihara Oil Mill, Ltd.) were added 0.15 parts of lecithin and 0.5 parts of the ubiquinol obtained in Production Example 1, and the mixture was heated for dissolving at 65° C. for use as an oil phase. Separately, 9 parts of total milk protein, 0.5 parts of lactalbumin, 3.5 parts of natural cream cheese, 2 parts of fermented milk, 7 parts of 70% solution of sorbitol, 7 parts of 70% solution of erythritol, 0.1 parts of glycerol fatty acid ester, and 0.1 parts of sucrose fatty acid ester were dissolved in 60 parts of water at 60° C. to prepare an aqueous phase. The above oil phase was combined with this aqueous phase and the mixture was emulsified with a homogenizer. The emulsion obtained was sterilized at 145° C. for 4 seconds, then subjected to pressure homogenization under 200 kg/cm², then cooled, and filled into a container to give a ubiquinol-enriched concentrated milk for processing use which had a rich flavor with the mellow taste and body of oil retained.

Example 13

Production of a White Sauce and Production of Pizza Pies and a Gratin-Filled Buns To the white sauce roux prepared by frying 100 g of wheat flour with 100 g of the ubiquinol-enriched margarine obtained in Example 2 was added 800 g of a two-fold aqueous dilution of the ubiquinol-enriched concentrated milk for processing use (400 g) as obtained in Example 12, supplemented with 1.0 g of common salt and spice, and the roux was diluted under stirring and heating at an ultimate temperature of 85° C. to produce a white sauce. This sauce was filled into cans and heat-treated with a retort sterilizer at 121° C. for 20 minutes, followed by cooling to room temperature to provide a retort white sauce. The white sauce thus obtained was good in both flavor and texture.

Meanwhile, to 100 parts of the above white sauce prior to said retort sterilization were added 10 parts of blanched chicken, 0.2 parts of yeast extract, and 0.6 parts of chicken soup stock to prepare a chicken gratin. When this was used as a pizza topping and a filling for dainty-filled buns, pizza pies and gratin-filled buns as tasteful as the conventional products were obtained.

Example 14

Production of a Whitener

After 360 parts by weight of soybean oil (brand name: Soybean Golden Salad Oil, product of Yoshihara Oil Mill, Ltd.) was warmed to 65 to 70° C., 7.2 parts by weight of soybean lecithin, 4.5 parts by weight of sucrose fatty acid ester (HLB=1), and 10 parts of the ubiquinol obtained in Production Example 1 were respectively added and dissolved to prepare an oil phase. Separately, 57.6 parts by weight of skim milk powder, 81 parts by weight of sodium caseinate, 40 parts of trehalose (brand name: Trehaose; distributed by Hayashibara Shoji, INC.), 18 parts by weight of sucrose, 1.8 parts by weight of the hydrophilic emulsifier polyglycerol fatty acid ester (brand name: Poem 0081 H (HLB=14); distributed by Riken Vitamin Co., Ltd.), 3.6 parts by weight of sucrose fatty acid ester (HLB=15), 5.4 parts by weight of disodium hydrogenphosphate, and 3.6 parts by weight of dipotassium hydrogenphosphate were respectively added and dissolved in 1,212.3 parts by weight of lukewarm water at 65 to 70° C. to prepare an aqueous phase. These aqueous phase and oil phase were fed to a homogenizer for preliminary emulsification under stirring and heating at 65 to 70° C. for 15 minutes. Then, the pressure to be applied was varied in two stages (first stage; 180 kg/cm², second stage; 50 kg/cm²) for further homogenization. Then, the homogenate was transferred to a UHT sterilizer, in which it was heated and sterilized at 145° C. for 2 seconds. The sterilized homogenate was further transferred to a sterile homogenizer in which it was further homogenized at 70° C. under the pressure varied in two stages (first stage: 100 kg/cm², second stage; 50 kg/cm²) to prepare a ubiquinol-enriched whitener which was fully acceptable in flavor.

Example 15

Production of a Custard Cream

Two egg yolks were beaten in a pan and, out of 200 ml of a two-fold aqueous dilution of the ubiquinol-enriched concentrated milk obtained in Example 12 (100 ml), 2 tablespoon-levels were added and admixed using a wooden spatula. Then, 2 tablespoonfuls of wheat flour and 40 g of sugar were added and thoroughly blended. The rest of the above concentrated milk dilution was added gradually and mixed evenly to prevent formation of lumps and boiled at 90° C. for 30 minutes with stirring until a creamy consistency had been obtained. After the mixture was allowed to cool for a brief time, vanilla essence was added and the whole was stirred well to prepare a ubiquinol-enriched custard cream with a rich flavor.

Example 16

Production of Cream Puffs

In an emulsification tank, 50 parts of an oil composition prepared from soybean oil (brand name: Soybean Golden Salad Oil, product of Yoshihara Oil Mill, Ltd.) 20%, hydrogenated soybean oil (m.p. 40° C.) 60%, and palm oil 20%, 1 part of the ubiquinol obtained in Production Example 1, 0.3 parts of lecithin, 0.3 parts of monoglyceride, 16 parts of water, and 2 parts of common salt were emulsified by stirring at 60° C. for 15 minutes. The resulting emulsion was quenched to 15° C. and mixed to give a ubiquinol-containing margarine. Then, 130 g of the above margarine and 130 ml of a two-fold dilution of 65 ml of the ubiquinol-enriched concentrated milk obtained in Example 12 were put in a pan and heated at 50° C. to melt the margarine and when the margarine had melted completely and the mixture began to boil, 800 g of sieved soft flour was added and mixed to dextrinize the starch. Then, 200 ml of whole egg was added in several portions and blended thoroughly. In the last stage where whole egg was added, 0.5 g of ammonium carbonate dissolved thoroughly in whole egg was added. Then, a squeeze bag fitted with a circular nozzle, 10 cm in diameter, was filled with the dough and the dough was squeezed out to make round dough pieces on a sheet of paper spread on an iron plate. Using a handy atomizer, the dough pieces were thoroughly exposed to a mist of water, set on the lower shelf of an oven heated at 200° C., and baked for 10 minutes. After sufficient distension was attained, the dough pieces were further baked at 170° C. to produce puff shells. After baking, the shells were allowed to cool on a wire-mesh screen. A crosswise slit was made in each puff shell at the level of about ⅓ from top and a custard cream prepared in Example 15 was inserted via the slit to produce ubiquinol-enriched cream puffs which were fully acceptable in flavor and texture.

Example 17

Preparation of Chocolate Bavarois

First, 250 ml of a two-fold dilution of the concentrated milk prepared in Example 12 and 20 g of sugar were put in a pan and heated. The fire was turned off just before boiling and the mixture was added portion-wise to a whipped mixture of 2 egg yolks and 20 g of sugar prepared in advance and the whole was stirred and heated over a low flame. Then, 6 g of gelatin reconstituted with water was added and the mixture was stirred and added through a filter portion-wise into a bowl containing 50 g of chocolate. After stirring the mixture obtained, 100 ml of the cream obtained in Example 11 was beaten and added thereto in 3 divided portions, and the whole was stirred. The mixture was poured into pudding molds and chilled well in the refrigerator to give a ubiquinol-enriched chocolate bavarois with a rich flavor.

Example 18

Production of a Curry Roux 39 parts of a roast flour prepared by using 20 parts of wheat flour and 20 parts of soybean oil (brand name: Soybean Golden Salad Oil, product of Yoshihara Oil Mill, Ltd.), 15 parts of edible oil/fat (mixture of lard and beef tallow), 1 part of the ubiquinol obtained in Production Example 1, 20 parts of curry powder, 10 parts of common salt, and 15 parts of various condiments such as bouillons were mixed under heating at 90° C. for 30 minutes to prepare a ubiquinol-enriched curry roux. Both the flavor and mouth-feel of the roux were fully acceptable. Moreover, using the ubiquinol (ubiquinol/ubiquinone ratio: 9/1) obtained in Production Example 2 in lieu of the ubiquinol obtained in Production Example 1, the above procedure was otherwise repeated to produce a ubiquinol-enriched curry roux.

Example 19

Production of a Béchamel Sauce

First, 100 g of soybean oil (brand name: Soybean Golden Salad Oil, product of Yoshihara Oil Mill, Ltd.) was placed in a thick-bottomed pan and, under heating, 100 g of soft flour and 5 g of the ubiquinol obtained in Production Example 1 were added together in one operation. While being careful to prevent burning, the mixture was stirred at 90° C. for 20 minutes using a wooden spoon. Thereafter, the pan was removed from the fire and allowed to cool briefly to obtain a white roux. Then, one cup of cold cow's milk was added and stirred evenly. Then, 1.5 cups of cow's milk at 10° C. was further added and using a beater, the whole was thoroughly stirred until brilliance had begun to appear. Thereafter, 2.5 cups of cow's milk at 10° C. was added and stirred well. Then, a cloves-stabbed onion and bay leaves were added and the whole was boiled down to a pulp-like consistency over a low flame. The bay leaves and onion were taken out, the slurry was filtered through a chinois, and the filtrate was transferred to the pan again and heated over a low flame to the extent just short of burning to produce 550 g of a ubiquinol-enriched béchamel sauce which was good in flavor and texture.

Example 20

Production of a Mayonnaise 5 parts of vinegar (acetic acid concentration; 10%), 2 parts of common salt, 0.5 parts of sugar, 0.3 parts of mustard powder, and 0.2 parts of water were put in a mixer and stirred together at 15° C. to 20° C. to prepare an aqueous phase. Then, an emulsion (10° C. to 15° C.) prepared by stirring 7 parts of egg yolk and 0.5 parts of the ubiquinol obtained in Production Example 1 was added to 68 parts of rice refined oil (shirashime-yu) portion-wise and the whole was stirred at 15° C. to 20° C. for preliminary emulsification. Then, using a colloid mill, a finish emulsification was performed to produce a ubiquinol-enriched mayonnaise. The mayonnaise obtained was fully comparable to the commercial mayonnaise in taste, body, and mouth-feel. Meanwhile, ubiquinol was extracted from the above mayonnaise to confirm that the mayonnaise contained 0.55% by weight of ubiquinol.

Example 21

Production of a French Dressing

In 33.1 parts of water were dissolved 15 parts of vinegar (acetic acid concentration: 10%), 8 parts of sugar, 3 parts of starch, 0.5 parts of pepper, and 0.4 parts of xanthan gum, and the solution was sterilized by heating at 80° C. for 30 minutes, followed by cooling to 20° C. Then, 40 parts of rice refined oil (shirashime-yu) preliminarily warmed to 10 to 15° C. and 1 part of the ubiquinol obtained in Production Example 1 were added and the whole was stirred at 15 to 20° C. for preliminary emulsification. Then, using a colloid mill, a finish emulsification was carried out to produce a French dressing. The French dressing obtained was good in taste, body, and mouth-feel.

Example 22

Production of a Potato Salad 5 parts of skinned potato and 1 part of carrot were respectively cut into cubes. These were wrapped up in Saran-wrap and cooked soft in a microwave oven set to the root vegetable cooking mode, followed by cooling. Then, 2 parts of onion slices rinsed in water prepared separately were added and, finally, 2 parts of the ubiquinol-enriched mayonnaise prepared in Example 20 was added. The whole was admixed to produce a ubiquinol-enriched potato salad which was good in flavor and mouth-feel.

Example 23

Preparation of an Ice Cream

Egg yolks equivalent to 10 hen's eggs was beaten in a vessel and 250 g of sugar and 10 g of corn starch were added and stirred well. Then, 1 L of a two-fold dilution of the ubiquinol-enriched concentrated milk obtained in Example 12 was warmed to 75° C. and mixed in gradually. The whole mixture was filtered through a fine-mesh screen, warmed at 90° C. for 45 minutes, and stirred gently using care not to cause burning until a syrupy consistency had been attained, followed by cooling on ice. After cooling, a small amount of vanilla essence was added and the whole was frozen with stirring at −20° C. When it had begun to solidify, 270 g of the ubiquinol-enriched whipped cream prepared in Example 11 was beaten and added. The whole was further cooled with stirring, distributed into cups, and frozen to obtain a vanilla ice cream with a good flavor and mouth-feel.

Example 24

Preparation of Puddings 1,000 ml of a two-fold dilution of the ubiquinol-enriched concentrated milk obtained in Example 12 was warmed up to about 40° C. and blended with a premix of 250 g of sugar and 250 g of whole egg. This pudding pastry was filtered through a strainer, cast into pudding molds, and baked on a water bath in an oven at 150° C. for 30 to 40 minutes to prepare custard puddings with a rich flavor.

Example 25

Production of a Pickling Liquor and Pork Cutlets 5 parts of soybean oil (brand name: Soybean Golden Salad Oil, product of Yoshihara Oil Mill, Ltd.), 0.1 parts of sodium caseinate, 0.1 parts of tetrasodium pyrophosphate, 2 parts of common salt, and 0.2 parts of the ubiquinol obtained in Production Example 1 were mixed and stirred and using a pressure homogenizer, the whole was emulsified at 100 kg/cm² to give a ubiquinol-enriched pickling liquor.

The pork loin for cutlets was injected with 20%, based on meat weight, of the above pickling liquor and, after massage, cut to the bite size, dipped through a batter solution, coated with crumbs, and fried. As a result, there was obtained ubiquinol-enriched pork cutlets which were juicy and had a rich flavor.

Example 26

Production of a Coating Oil/Fat Composition and Butter Rolls 2 parts of beaten eggs was gradually added to 68 parts of water and dispersed with a homomixer, followed by warming to 70° C. Then, an oil composition prepared by dissolving 1 part of the ubiquinol obtained in Production Example 1 in 30 parts of soybean oil (brand name: Soybean Golden Salad Oil, product of Yoshihara Oil Mill, Ltd.) in advance was gradually added and the whole was further stirred for 10 minutes, sterilized at 142° C. for 2 seconds, and emulsified with a pressure homogenizer at 100 kg/cm² to give a ubiquinol-enriched coating oil/fat composition.

The coating oil/fat composition obtained was applied to fermented butter roll doughs, 0.5 g per roll, and baked at 200° C. for 9 minutes to give ubiquinol-enriched butter rolls with good brilliance and flavor.

Example 27

Production of Croquette

The croquette-dough prepared by the conventional procedure was coated with a batter prepared by mixing a batter mix powder (brand name: Batter Mix U-869, product of Riken Vitamin Co., Ltd.), rapeseed oil and water in a ratio of 1:2:4 and, then, with crumbs, and the whole was fried at 170° C. to prepare croquettes. The face and reverse sides of each croquette (about 40 g) were sprayed with 1 g of the coating composition obtained in Example 26. The ubiquinol-enriched croquettes thus obtained were very satisfactory in texture and flavor even after frozen storage and recooking with a microwave oven.

Example 28

Production of Snack Confections 55 parts of corn flour, 13 parts of potato starch, 3 parts of granulated sugar, 0.5 parts of common salt, and 22 parts of water were fed to a twin-screw extruder and, after 7 seconds' residence at a barrel temperature of 140° C., extruded into a spiral form. The resultant was cut at 30 mm pitches to prepare 0.8 mm-thick snack doughs. The snack doughs thus obtained were subjected to 16 hours' preliminary dehydration at 40° C. and, further to a swelling treatment using a conveyor dryer at 260° C. for 26 seconds. 100 g of the swollen doughs were sprayed with 3 g of the coating oil/fat composition obtained in Example 26 to give ubiquinol-enriched snack confections good in flavor, color, and gloss.

Example 29

Production of Noodles (Udon)

First, an oil phase composition consisting of 20 parts of soybean oil (brand name: Soybean Golden Salad Oil, product of Yoshihara Oil Mill, Ltd.), 2.5 parts of glycerol saturated fatty acid monoester (brand name: EMALGEE MS, product of Riken Vitamin Co., Ltd.), 0.8 parts of glycerol unsaturated fatty acid monoester (brand name: Poem OL-200, product of Riken Vitamin Co., Ltd.), 0.05 parts of polyglycerol fatty acid ester (brand name: Poem OL-100A, product of Riken Vitamin Co., Ltd.), 1.5 parts of sucrose fatty acid ester (HLB=1) (brand name: DKF-10, product of Dai-Ichi Kogyo Seiyaku Co., Ltd.), 0.4 parts of lecithin, and 1 part of the ubiquinol obtained in Production Example 1 was stirred and heated for dissolving to prepare an oil phase. On the other hand, an aqueous phase composition of 30 parts of water, 13 parts of reduced starch saccharification product (brand name: Eswee 57 (solids; 75%), product of Nikken Chemicals Co., Ltd.), and 25 parts of sorbitol (brand name: Sorbitol F (solids: 70%), product of Nikken Chemicals Co., Ltd.) was heated under stirring for use as an aqueous phase. Then, these oil phase and aqueous phase were mixed and emulsified with a homomixer, followed by further stirring and mixing to give a ubiquinol-enriched emulsified oil/fat composition. To 3 parts each of the oil emulsion obtained above were added 100 parts of wheat flour and 32 parts of water, and the whole was kneaded, formed, and rolled in the conventional manner. The resulting 2.5 mm-thick dough sheet was divided with a No. 10 cutter blade to give raw noodles. These raw noodles were boiled in boiling water for 7 minutes and the condition and texture of the boiled noodles were evaluated. It was found that these noodles had a sufficient body. Meanwhile, the raw noodles were stored in the refrigerator for 10 days and evaluated in the same manner as the boiled noodles. It was found that the raw noodles were also fully acceptable in flavor and texture.

Example 30

Production of a Tea with Milk

In 50 g of a hot water extract of black tea leaves were dissolved 60 g of granulated sugar, 0.5 g of sucrose fatty acid ester, and 1 g of sodium hydrogencarbonate, followed by addition of 50 g of the ubiquinol-enriched concentrated milk for processing use as obtained in Example 12, and the whole was diluted to 1,000 ml with water to prepare an emulsion having a rich flavor. This emulsion was heated to 80° C., filled into cans (190 ml), and subjected to retort sterilization at 124° C. for 20 minutes, whereby a canned ubiquinol-enriched tea with milk-beverage having a body characteristic of oil/fat was obtained.

Example 31

Production of Cafè Au Lait (Coffee with Milk)

50 g of the ubiquinol-enriched concentrated milk for processing use as obtained in Example 12 was formulated with 50 g of coffee extract, 60 g of granulated sugar, 0.5 g of sucrose fatty acid ester, and 1 g of sodium hydrogencarbonate and the mixture was emulsified by stirring to prepare a ubiquinol-enriched cafè au lait which was good in flavor and body.

Example 32

Production of a Sour Beverage

To each of 100 g portions of rice refined oil (shirashime-yu) taken, 130 g of sucrose diacetate hexaisobutyrate, 2 g of the ubiquinol obtained in Production Example 1, and 1 g of natural vitamin E were mixed and dissolved to obtain a homogeneous oily material mixture. This mixture was added to a solution prepared by mixing and dissolving 615 g of glycerol, 60 g of decaglycerol monooleate (HLB=12), and 135 g of water and dispersed by preliminary stirring. Then, using T.K. Homomixer (manufactured by Tokushu Kika Kogyo Co., Ltd.), the above dispersion was emulsified at 5,000 rpm for 10 minutes to prepare a homogeneous emulsion composition. Separately, 200 g of granulated sugar, 5 g of citric acid, and 0.5 g of vitamin C were dissolved in a suitable quantity of water, and the solution was adjusted to pH 3.0 with sodium citrate and diluted to 2 L with water to prepare a syrup for sour beverage use. To 180 ml each of this syrup, 20 ml each of the above-prepared emulsion was added and mixed, filled into a bottle, capped, sterilized at 85° C. for 15 minutes, and cooled to provide a ubiquinol-enriched sour beverage.

Example 33

Production of a Coffee Beverage 6 g of sucrose fatty acid ester (HLB=16), 8 g of sorbitan fatty acid ester (HLB=7), 1 g of phosphate, 0.5 g of carrageenan, 65 g of sodium caseinate, 38 g of sodium ascorbate, and 550 g of water were admixed and warmed to 60° C. for dissolving. Separately, 200 g of rice refined oil (shirashime-yu), 100 g of hydrogenated soybean oil, 2 g of sucrose fatty acid ester (HLB=1), 5 g of the ubiquinol obtained in Production Example 1, 0.5 g of natural vitamin E, 0.5 g of β-caro- tene, 0.3 g of lecithin, and 0.1 g of sesame lignan were mixed together and warmed to 60° C. for dissolving. To the above aqueous phase maintained at 60° C., this oil phase similarly maintained at 60° C. was added, and the mixture was stirred for preliminary emulsification. Then, the resultant was homogenized under a pressure of 180 kg/cm$^2$ and the resulting homogenate was subjected to UHT sterilization at 120° C. for 20 seconds and filled into a container to give an aseptic emulsion. Then, 50 g of a hot water extract of roast coffee beans, 60 g of granulated sugar, 0.5 g of sucrose fatty acid ester, and 1 g of sodium hydrogencarbonate were added and dissolved. Then, 20 g of the aseptic emulsion obtained above was added and the whole was diluted to 1,000 ml with water to give an emulsion-containing coffee extract. The extract was heated to 80° C., filled into cans (190 ml), and subjected to retort sterilization at 124° C. for 20 minutes to prepare canned ubiquinol-enriched coffee drinks with a good flavor.

Example 34

Increase of Ubiquinol Concentration in Blood Due to Cheese Feeding

Processed cheese, 998 parts by weight per experiment, was melted by heating, and 2 parts by weight of the ubiquinol obtained in Production Example 1, 2 parts by weight of ubiquinone (product of Kaneka Corporation, purity: 99.2%), and 2 parts by weight of a mixture of 4 parts by weight of the ubiquinol obtained in Production Example 1 and 6 parts by weight of ubiquinone (product of Kaneka Corporation, purity: 99.2%) were respectively added, followed by cooling to prepare processed cheeses each enriched with a total of 0.2% by weight of ubiquinol and/or ubiquinone.

16 male Crj:CD (SD) rats (body weights 260 g to 300 g) were divided into 4 groups of 4 individuals. The first group (ubiquinol group) was fed on the ubiquinol-enriched cheese, the second group (ubiquinone group) on the ubiquinone-enriched cheese, the third group (ubiquinol/ubiquinone group) on the cheese enriched with a mixture of 4 parts by weight of ubiquinol and 6 parts by weight of ubiquinone, and the fourth group (control group) on the cheese neither enriched with ubiquinol nor enriched with ubiquinone, in a uniform daily ration of 10 g, with free access to water, for one week. On the morning of week 1, the blood was withdrawn from the abdominal aorta of each animal under ether anesthesia. To 1.0 ml of the plasma collected, 2.0 ml of water, 4.0 ml of ethanol, 10.0 ml of n-hexane were serially added and the mixture was shaken vigorously for about 5 minutes and then centrifuged for phase separation. The organic solvent layer was recovered and the remaining aqueous layer was subjected to extraction twice with adding 10.0 ml portions of n-hexane. The organic solvent layers obtained were pooled and the solvent was distilled off under reduced pressure to obtain a dry residue. The dry residue was dissolved in 250 μl of ethanol:1 N-hydrochloric acid (99:1, v/v) and a 10 μl portion of the solution was analyzed by high performance liquid chromatography [HPLC parameter settings: column; YMC-PacKR & D ODS, 250×4.6 mm (manufactured by YMC Co., Ltd.), mobile phase; 0.5 M NaClO$_4$/C$_2$H$_5$OH:CH$_3$OH: CH$_3$CN:70% HClO$_4$ (400:300:300:1, v, v), detection wavelength: 275 nm, flow rate: 1 ml/min] and the blood concentration of ubiquinol and ubiquinone (in terms of ubiquinone) was determined. The result was that the above-mentioned blood concentration of 4 animals/group was 0.01 μg/ml on the average in the control group, 0.41 μg/ml on the average in the ubiquinone group, 0.50 μg/ml on the average in the ubiquinol/ubiquinone group, and 0.63 μg/ml on the average in the ubiquinol group. It could thus be verified that the ingestion of ubiquinol-enriched cheese resulted in a significant increase in the above-mentioned blood concentration, thus being useful for the supply of ubiquinol which is liable to become insufficient.

Reference Example 1

The ubiquinol (crystals) obtained in Production Example 1 and the oils mentioned in Table 1 to each of which the ubiquinol (crystals) was added at a final concentration of 6% were stored in the air at 40° C., protected from light. The ubiquinol/ubiquinone ratios determined after 3 days of storage are presented in Table 1. In the medium-chain fatty acid triglyceride used, the fatty acid containing 8 carbon atoms accounted for 60% and the fatty acid containing 10 carbon atoms accounted for 40%.

TABLE 1

| Edible oil/fat | Ubiquinol/ubiquinone ratio |
| --- | --- |
| Soybean oil | 97.5/2.5 |
| Safflower oil | 95.2/4.8 |
| Coconut oil | 98.0/2.0 |
| Palm oil | 97.2/2.8 |
| Rapeseed oil | 97.8/2.2 |
| Rice oil | 97.0/3.0 |
| Peanut oil | 96.8/3.2 |
| Wheat germ oil | 96.5/3.5 |
| Lard | 96.4/3.6 |
| Milk fat | 97.5/2.5 |
| Perilla oil | 97.2/2.8 |
| Hydrogenated fish oil | 97.5/2.5 |
| Cottonseed oil | 97.4/2.6 |
| Medium-chain fatty acid triglyceride | 97.1/2.9 |
| Crystals | 75.0/25.0 |

INDUSTRIAL APPLICABILITY

The ubiquinol-enriched oil/fat-containing food of the present invention is a food which can supply ubiquinol, a substance indispensable to the living body but liable to be decreased and fall short of the requirements, through ingestion in the same ways as the ordinary oil/fat-containing foods, and is of use as a food for the prevention or amelioration of the fatigue and various kinds of poor health conditions arising from ubiquinol deficiencies. With the ubiquinol-enriched oil/fat-containing food of the present invention, one may consistently correct for one's own ubiquinol deficiency without satiation while leading a daily life.

The invention claimed is:

1. A process for producing a ubiquinol-enriched oil/fat-containing food product for human ingestion
which comprises dissolving ubiquinol in oil/fat under heating, cooling an obtained solution to give a homogeneous oil/fat composition and manufacturing the ubiquinol-enriched oil/fat-containing food product using the composition
wherein the oil/fat has a melting point of not lower than 20° C. and the homogeneous oil/fat composition is obtained by cooling the obtained solution by quenching to 20° C. or below thereby solidifying the composition or cooling the obtained solution by quenching to 20° C. or below and kneading it thereby plasticizing the composition or the oil/fat has a melting point of below 20° C. and the homogenous liquid oil/solid fat composition is an oil-in-water emulsion by quenching the obtained solution to 10° C. or below.

2. A process for producing the ubiquinol-enriched oil/fat-containing food product
according to claim 1 which comprises adding ubiquinol having a purity in excess of 0.01%.

3. The process for producing the ubiquinol-enriched oil/fat-containing food product for human ingestion according to claim 1 wherein the ubiquinol-enriched oil/fat-containing food product for human ingestion further contains ubiquinone and the ubiquinol/ubiquinone ratio is not less than 1/2 (by weight).

4. The process for producing the ubiquinol-enriched oil/fat-containing food product for human ingestion according to claim 1 wherein the ubiquinol-enriched oil/fat-containing food product for human ingestion has been enriched with ubiquinol and ubiquinone in a proportion of 0.0001 to 50% by weight as ubiquinone based on the total weight of the oil/fat-containing food product.

5. The process for producing the ubiquinol-enriched oil/fat-containing food product for human ingestion according to claim 1 wherein the oil/fat content of the ubiquinol-enriched oil/fat-containing food product is not less than 0.5% by weight.

6. The process for producing the ubiquinol-enriched oil/fat-containing food product for human ingestion according to claim 1 wherein the ubiquinol-enriched oil/fat-containing food product for human ingestion is at least one species selected from the group consisting of edible oils/fats, milk, dairy products, sauces, breads, pies, cakes, confections, roux, seasoning liquors, ice confections, noodles, processed foods, boiled rice preparations, jams, canned foods, and beverages.

7. The process for producing the ubiquinol-enriched oil/fat-containing food product for human ingestion according to claim 1 wherein said homogeneous oil/fat composition is an oil-in-water emulsion or a water-in-oil emulsion.

8. The process for producing the ubiquinol-enriched oil/fat-containing food product for human ingestion according to claim 1 wherein the ubiquinol-enriched oil/fat-containing food product is an ordinary food product in a form other than tablet or capsule form.

9. The process for producing the ubiquinol-enriched oil/fat-containing food product for human ingestion according to claim 1, wherein the oil/fat has a melting point not lower than 20° C.

* * * * *